US012578834B2

(12) United States Patent
Murley et al.

(10) Patent No.: US 12,578,834 B2
(45) Date of Patent: Mar. 17, 2026

(54) SHAPE-BASED GRAPHICAL INDICATIONS OF INTERACTION EVENTS

(71) Applicant: Apple Inc., Cupertino, CA (US)

(72) Inventors: Vicki M Murley, Pacifica, CA (US); Etienne Segonzac, Paris (FR); Timothy P Horton, San Jose, CA (US); Dean Jackson, Yass (AU); Chelsea E Pugh, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/019,623

(22) Filed: Jan. 14, 2025

(65) Prior Publication Data

US 2025/0238110 A1      Jul. 24, 2025

Related U.S. Application Data

(60) Provisional application No. 63/622,906, filed on Jan. 19, 2024.

(51) Int. Cl.
*G06F 3/0481*      (2022.01)
*G02B 27/01*      (2006.01)
(Continued)

(52) U.S. Cl.
CPC ......... *G06F 3/0481* (2013.01); *G02B 27/017* (2013.01); *G06F 3/011* (2013.01);
(Continued)

(58) Field of Classification Search
CPC .. G06F 3/011–015; G06F 3/017; G06F 3/048; G06F 3/0481; G06F 3/04817;
(Continued)

(56) References Cited

U.S. PATENT DOCUMENTS 6,181,343 B1      1/2001   Lyons
6,898,765 B2 *    5/2005   Matthews, III .... H04N 21/4438
                                              348/E5.103
(Continued)

FOREIGN PATENT DOCUMENTS

CN      1059229946 B      1/2018
CN      111949131 B       4/2023
(Continued)

*Primary Examiner* — Patrick F Marinelli

(74) *Attorney, Agent, or Firm* — Thompson Hine LLP

(57)      ABSTRACT

Devices, systems, and methods that interpret user activity as user interactions with virtual elements (e.g., user interface elements) positioned within a three-dimensional (3D) space, such as an extended reality (XR) environment. For example, an example process may include presenting a view of a 3D environment with user interface elements that are positioned at 3D positions based on a 3D coordinate system. The process may further include determining a shape of the one or more user interface elements. The process may further include receiving data corresponding to user activity in the 3D coordinate system. The process may further include identifying a user interaction event associated with a first user interface element in the 3D environment based on the data corresponding to the user activity. The process may further include providing a graphical indication corresponding to the determined shape of the first user interface element.

18 Claims, 9 Drawing Sheets

(51) Int. Cl.

| | |
|---|---|
| *G06F 3/01* | (2006.01) |
| *G06F 3/04817* | (2022.01) |
| *G06F 3/0482* | (2013.01) |

(52) U.S. Cl.

CPC .............. *G06F 3/013* (2013.01); *G06F 3/017* (2013.01); *G06F 3/04817* (2013.01); *G06F 3/0482* (2013.01)

(58) Field of Classification Search

CPC ................. G06F 3/0482; G06F 3/0483; G06F 3/0484–0486; G06F 3/0487–04886

See application file for complete search history.

(56) References Cited

U.S. PATENT DOCUMENTS

| | | | | |
|---|---|---|---|---|
| 10,289,270 | B2 * | 5/2019 | Ann ...................... | G06F 3/0482 |
| 10,539,787 | B2 | 1/2020 | Haddick et al. | |
| 10,839,572 | B2 | 11/2020 | Church | |
| 11,511,199 | B2 | 11/2022 | Marchiorello | |
| 12,407,769 | B2 * | 9/2025 | Wang ................... | H04M 1/0235 |
| 2015/0227795 | A1 * | 8/2015 | Starner ................ | G02B 27/017 |
| | | | | 348/143 |
| 2016/0011727 | A1 * | 1/2016 | Ann .................... | G06F 3/04842 |
| | | | | 715/823 |
| 2021/0191600 | A1 * | 6/2021 | Lemay .................... | G06F 3/013 |
| 2023/0154122 | A1 * | 5/2023 | Dascola ................. | G06F 3/011 |
| | | | | 345/633 |
| 2023/0306695 | A1 | 9/2023 | Rockel et al. | |
| 2023/0333643 | A1 | 10/2023 | Schmidtchen et al. | |
| 2023/0419593 | A1 * | 12/2023 | Da Veiga ............... | G06F 3/013 |
| 2025/0238110 | A1 * | 7/2025 | Murley ................... | G06F 3/017 |
| 2025/0258591 | A1 * | 8/2025 | Lin ..................... | G06F 3/04815 |
| 2025/0258686 | A1 * | 8/2025 | Federighi ........... | G06F 3/04842 |

FOREIGN PATENT DOCUMENTS

| | | | |
|---|---|---|---|
| DE | 102023204789 | A1 | 11/2023 |
| JP | 7227314 | B2 | 2/2023 |

* cited by examiner

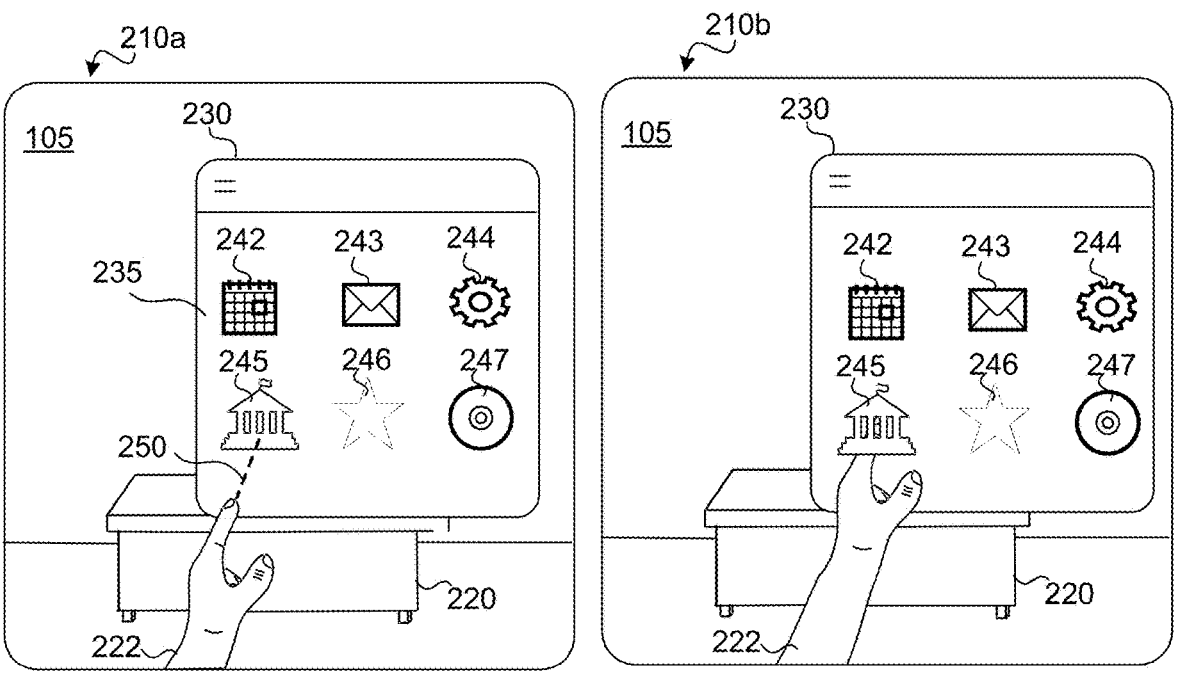
FIG. 2
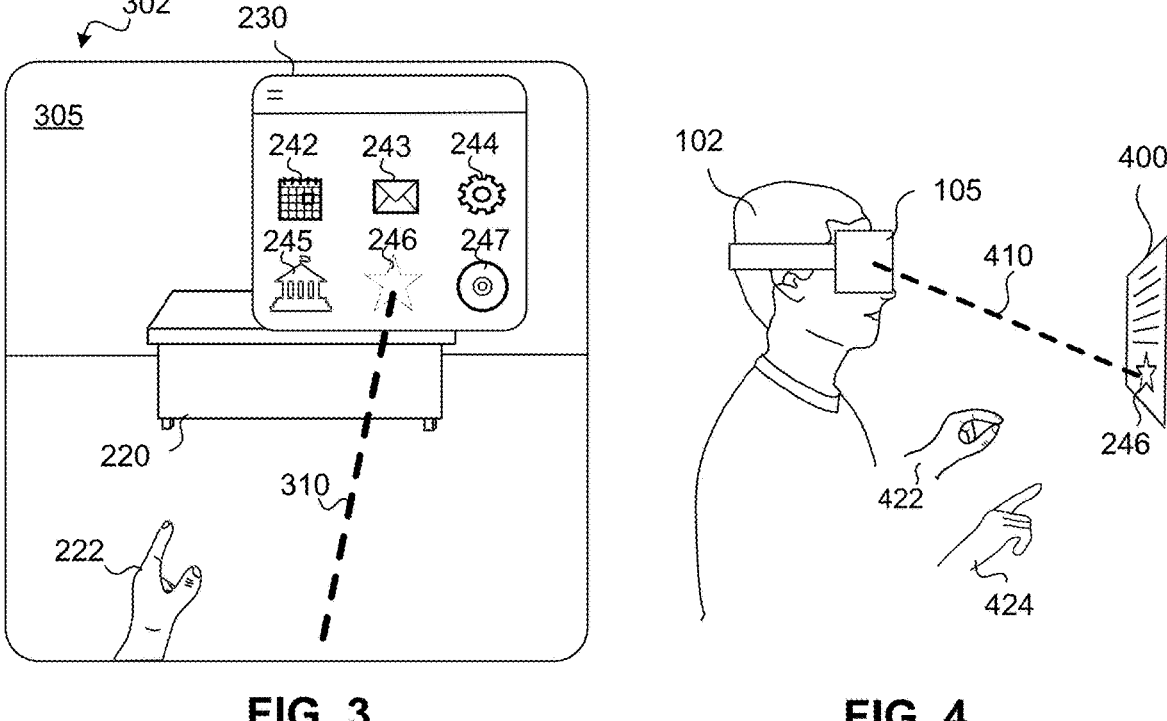
FIG. 3        FIG. 4

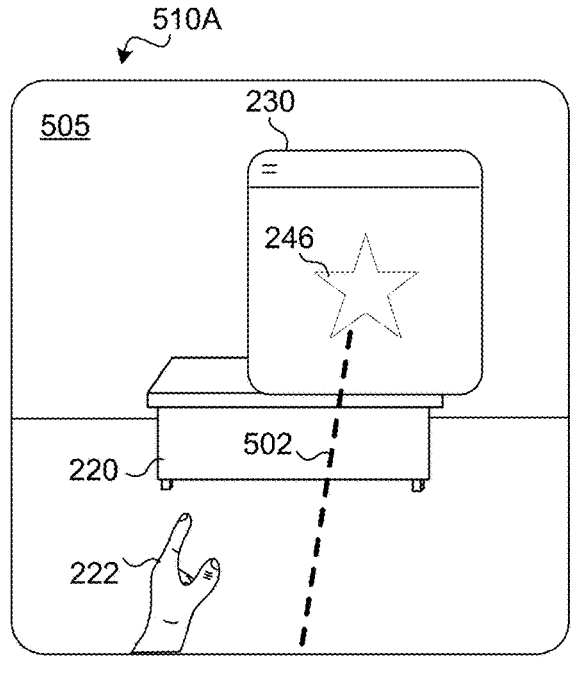
FIG. 5A
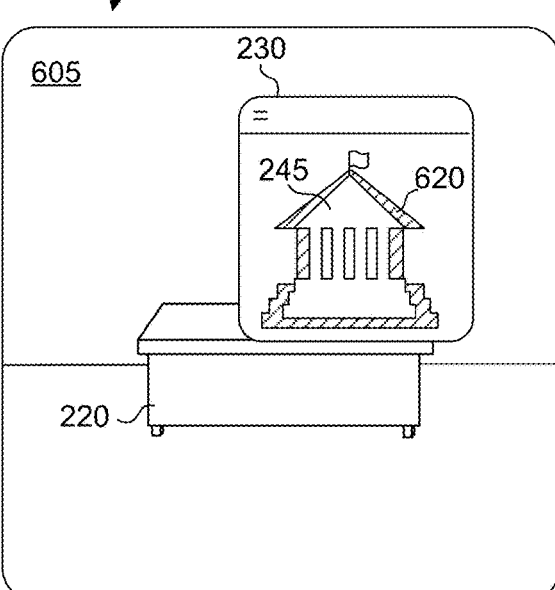
FIG. 5B
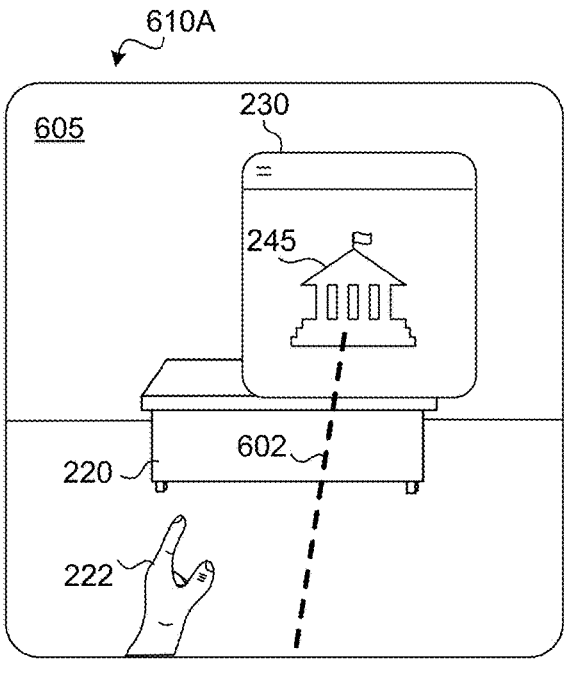
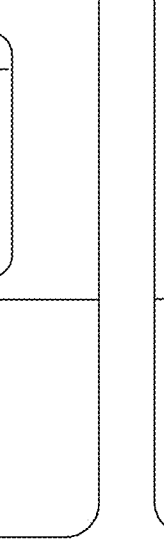
FIG. 6A
FIG. 6B

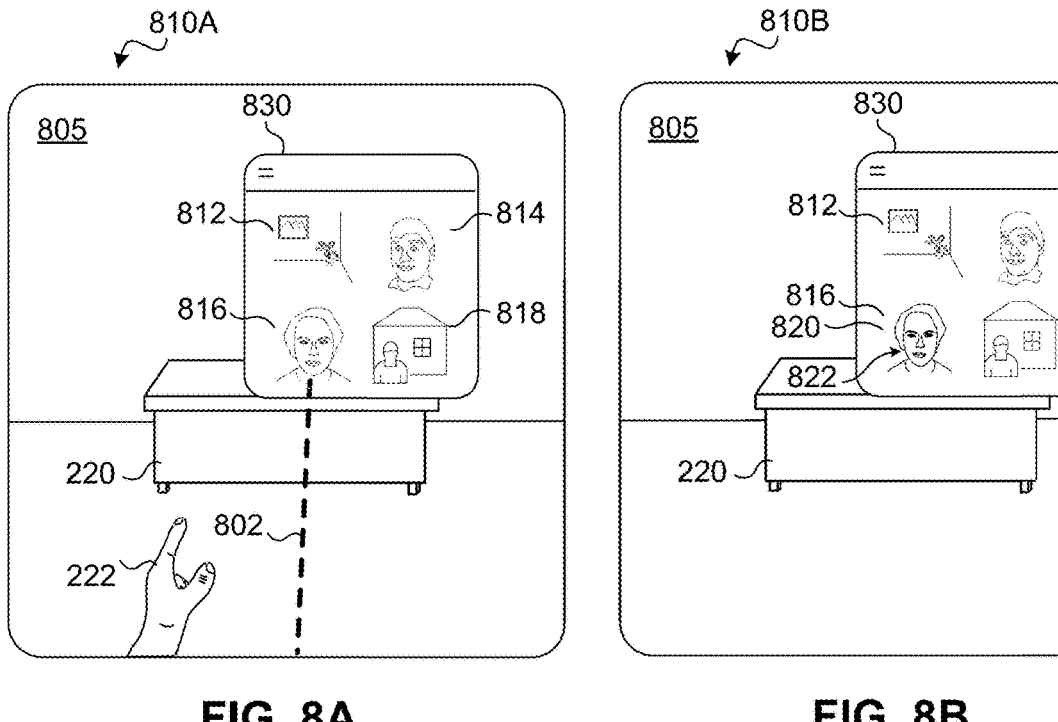
FIG. 8A          FIG. 8B
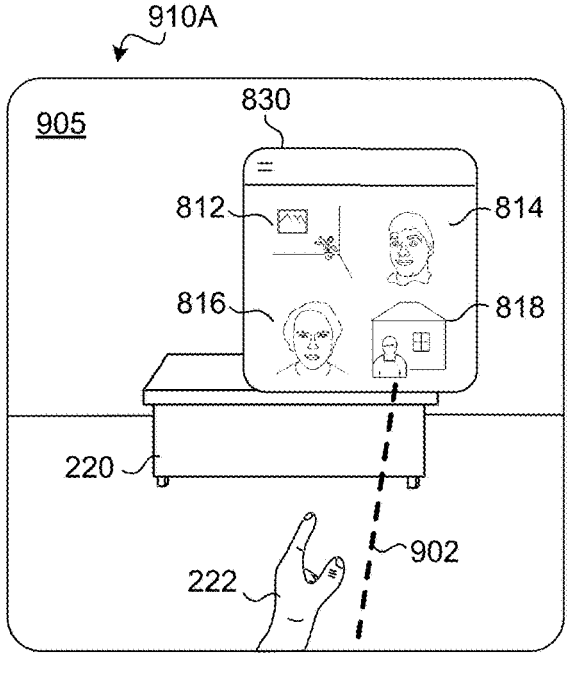          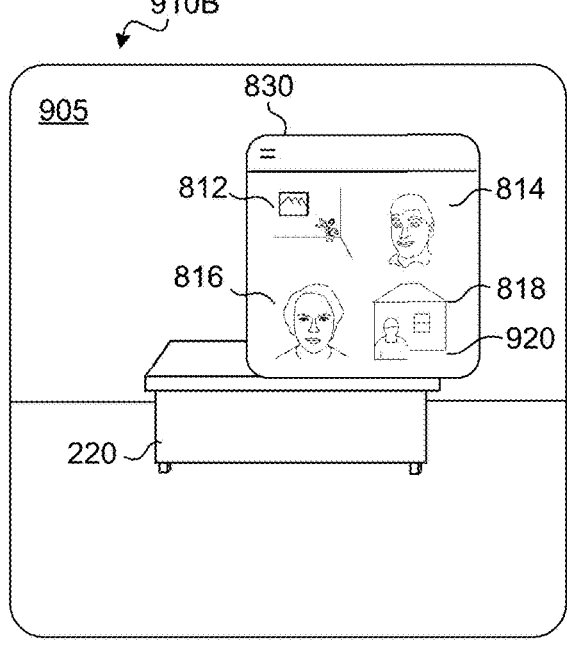
FIG. 9A          FIG. 9B

1200

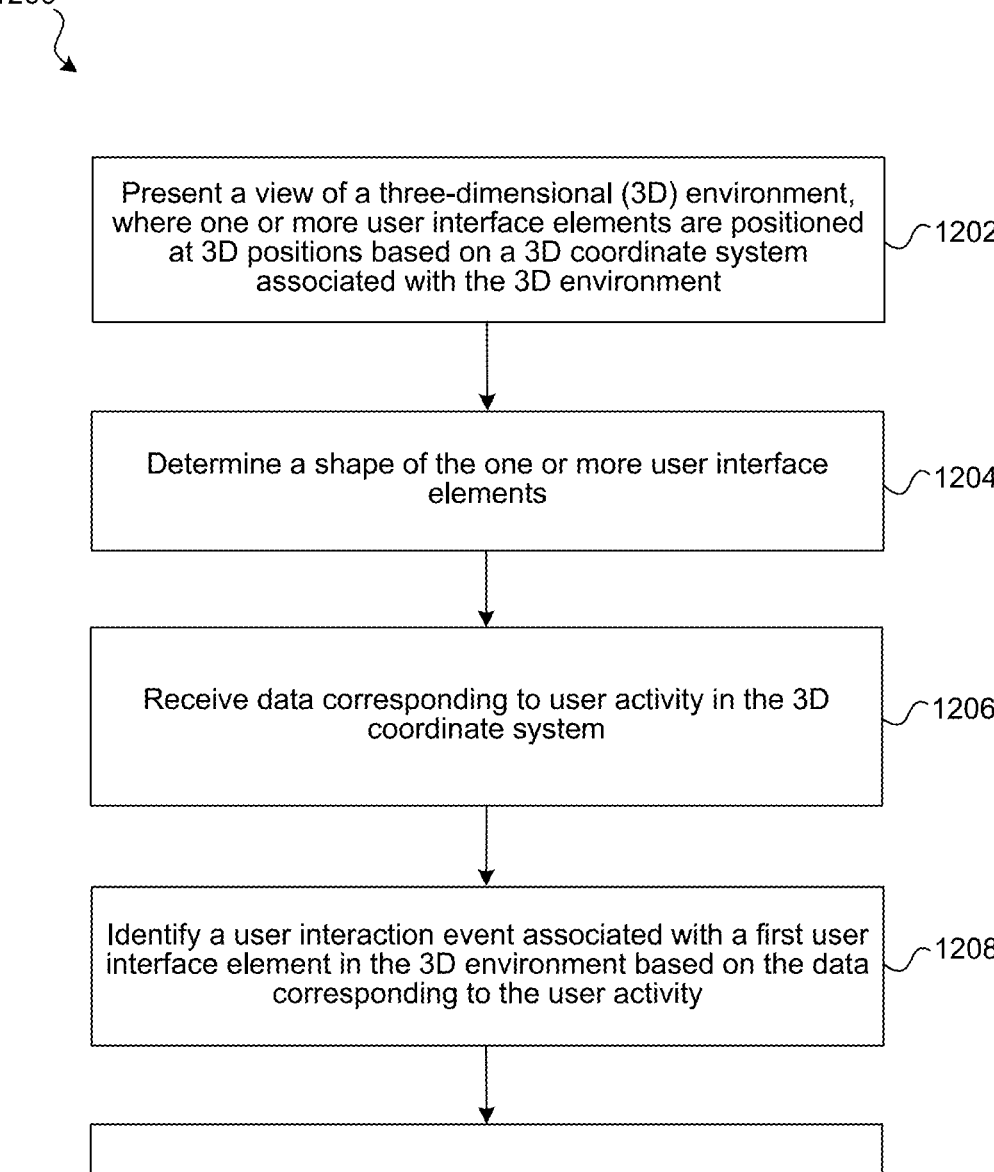

Present a view of a three-dimensional (3D) environment, where one or more user interface elements are positioned at 3D positions based on a 3D coordinate system associated with the 3D environment — 1202

Determine a shape of the one or more user interface elements — 1204

Receive data corresponding to user activity in the 3D coordinate system — 1206

Identify a user interaction event associated with a first user interface element in the 3D environment based on the data corresponding to the user activity — 1208

Provide a graphical indication corresponding to the determined shape of the first user interface element — 1210

FIG. 12

Device 1300

SHAPE-BASED GRAPHICAL INDICATIONS OF INTERACTION EVENTS

CROSS-REFERENCE TO RELATED APPLICATIONS

This application claims the benefit of U.S. Provisional Application Ser. No. 63/622,906 filed Jan. 19, 2024, which is incorporated herein in its entirety.

TECHNICAL FIELD

The present disclosure generally relates to systems, methods, and devices that enable assessing user interactions to control graphical indications with respect to user interface elements of a user interface of an electronic device.

BACKGROUND

It may be desirable to detect movement and interactions associated with icons of a user interface while a user is using a device, such as a head mounted device (HMD). However, existing systems may not provide adequate display of the interactions when a user is navigating to or selecting an icon of the user interface associated with user attention.

SUMMARY

Various implementations disclosed herein include devices, systems, and methods that interpret user activity as user interacts with virtual elements (e.g., user interface elements) positioned within in a three-dimensional (3D) space such as an extended reality (XR) environment. Some implementations utilize an architecture that receives application user interface geometry in a system or shared simulation area and outputs data (e.g., less than all user activity data) for an application to use to recognize input. An operating system (OS) process may be configured to provide an input support process to support recognizing input intended for one or more separately-executing applications, for example, by providing some input recognition tasks to recognize user activity as input for the applications or by converting user activity data into a format that can be more easily, accurately, efficiently, or effectively interpreted by the applications and/or in a way that facilitates preservation of user privacy. The OS process may include a simulation process that utilizes application user interface information to provide 3D information (e.g., 3D world data) used by the input support process to support recognizing input intended for the one or more separate (e.g., separately executing) apps.

Various implementations disclosed herein graphically indicate the determined shape of a user interface element on a two-dimensional (2D) webpage viewed in an XR environment using a 3D display device (e.g., a wearable device such as a head-mounted device (HMD)) based on a user's intent (attention) directed at the user interface element. The goal is to match arbitrary shapes of a user interface element with a visual effect that provides a glow or a highlight compared a standard visual effect for all user interface elements, such as a square shaped highlight.

Various implementations disclosed herein may provide a method that matches a graphical indication to a determined shape of the user interface element rather than using a predefined shape (e.g., a standard rectangle shape that surrounds a circular element). In other words, if the user interface element is a star shape, the glow or highlight around the user interface element will also display a star shape.

In some implementations, the user's intent may be based on determining that a user attention direction is towards the user interface element based on sensor data. For example, the user-based data may include gaze data, hands data, head data, etc., or other input data (e.g., data from an input controller). The visual effect may be based on the type of user interface element (e.g., a photo gallery), a temporal aspect (delay until the glow, or brighter based on a length of gaze), identified sub-elements, a type of interaction (gaze, pinch, gaze and pinch combination, etc.), and the like. In some implementations, identifying the shape of the user interface element may be based on image maps, metadata, image recognition, etc.

In some implementations, providing a graphical indication (e.g., a visual effect such as a glow, highlight, etc.) corresponding to the determined shape of the user interface element may include matching a border/shape of the user interface element rather than take a predefined shape (e.g., rectangle that surrounds a circular affordance). In some implementations, providing the graphical indication may remove transparent areas associated with the user interface element. In some implementations, configuring the graphical indication may be based on determining a type of user interface element. For example, for photo icons, the shape determination techniques for determining a type of user interface element may use attributes of the photo icon such as size, entropy, and/or resolution to configure the visual effect based on confidence thresholds. In some implementations, there may be size constraints. For example, if the user interface element is too large, then the visual effect may not be shown. In some implementations, the color of the user interface element may match the glow of the visual effect (e.g., a red glow associated with a generally red user interface element).

In some implementations, the methods described herein for providing graphical indications are based on temporal aspects. For example, the graphical indication (e.g., a visual effect) may not provide a graphical effect (e.g., a glow) until after a few milliseconds of user attention (e.g., gaze and/or a point towards at a particular icon). Additionally, or alternatively, in some implementations, the graphical indication (e.g., a visual effect such as a glow or highlight), may get brighter and brighter based on a user looking at the element for a length of time. Additionally, or alternatively, in some implementations, the graphical indication may provide a different visual effect based on the shape of the user interface element (e.g., a round shaped glow with gradient centered where user is looking, but if a star shape, then there may be a star shape glow that matches).

User privacy may be preserved by only providing some user activity information to the separately-executed apps, e.g., withholding user activity information that is not associated with intentional user actions such as user actions that are intended by the user to provide input or certain types of input. In one example, raw hands and/or gaze data may be excluded from the data provided to the applications such that applications receive limited or no information about where the user is looking or what the user is looking at times when there is no intentional user interface interaction.

In general, one innovative aspect of the subject matter described in this specification can be embodied in methods that include the actions of, at a device having a processor, presenting a view of a three-dimensional (3D) environment, wherein one or more user interface elements are positioned at 3D positions based on a 3D coordinate system associated with the 3D environment. The actions may further include determining a shape of the one or more user interface elements. The actions may further include receiving data corresponding to user activity in the 3D coordinate system. The actions may further include identifying a user interaction event associated with a first user interface element in the 3D environment based on the data corresponding to the user activity. The actions may further include, in accordance with identifying the user interaction event, providing a graphical indication corresponding to the determined shape of the first user interface element.

These and other embodiments may each optionally include one or more of the following features.

In some aspects, determining the shape is based on identifying that a user interface element includes an interactive item. In some aspects, determining the shape is based on formatting information associated with the one or more user interface elements. In some aspects, determining the shape is based on an image map associated with the one or more user interface elements.

In some aspects, providing the graphical indication corresponding to the determined shape of the first user interface element includes matching a shape of the graphical indication to the shape of the first user interface element.

In some aspects, determining the shape of the first user interface element includes identifying sub-elements of the first user interface element, and determining the shape of the first user interface element based on the identified sub-elements.

In some aspects, the graphical indication corresponds to the identified sub-elements of the first user interface element. In some aspects, providing the graphical indication includes removing a portion of a view of the first user interface element within the view of the 3D environment. In some aspects, the graphical indication is a highlighting effect corresponding to the user interface element. In some aspects, the graphical indication is a glow effect corresponding to the user interface element. In some aspects, the graphical indication is based on determining a type of the user interface element.

In some aspects, the graphical indication is displayed for a first instance based on one or more first attributes, and wherein the graphical indication is displayed for a second instance different than the first instance based on one or more second attributes different than the first attributes.

In some aspects, the data corresponding to the user activity is obtained via one or more sensors on the device. In some aspects, the data corresponding to the user activity includes gaze data including a stream of gaze vectors corresponding to gaze directions over time during use of the electronic device. In some aspects, the data corresponding to the user activity includes hands data including a hand pose skeleton of multiple joints for each of multiple instants in time during use of the electronic device. In some aspects, the data corresponding to the user activity includes hands data and gaze data. In some aspects, the data corresponding to the user activity includes controller data and gaze data. In some aspects, the data corresponding to the user activity includes head pose data of the user.

In some aspects, the electronic device includes a head-mounted device (HMD).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 2 illustrates views, provided via a device, of user interface elements within the 3D physical environment of FIGS. 1A-1B in which the user performs interactions in accordance with some implementations.

FIG. 3 illustrates a view, provided via a device, of user interface elements within the 3D physical environment of FIGS. 1A-1B in which the user performs an interaction in accordance with some implementations.

FIG. 4 illustrates an example of tracking movements of hands and gaze during an interaction, in accordance with some implementations.

FIGS. 5A and 5B illustrate views of an example of interaction recognition of user activity and displaying a graphical indication based on a determined shape of a user interface element, in accordance with some implementations.

FIGS. 6A and 6B illustrate views of an example of interaction recognition of user activity and displaying a graphical indication based on a determined shape of a user interface element, in accordance with some implementations.

FIGS. 8A and 8B illustrate views of an example of interaction recognition of user activity and displaying a graphical indication based on a determined shape of a user interface element associated with photographic elements, in accordance with some implementations.

FIGS. 9A and 9B illustrate views of an example of interaction recognition of user activity and displaying a graphical indication based on a determined shape of a user interface element associated with photographic elements, in accordance with some implementations.

FIG. 12 is a flowchart illustrating a method for providing a graphical indication corresponding to a determined shape of a user interface element based on identifying a user interaction event corresponding to the user activity, in accordance with some implementations.

Figure 1A:
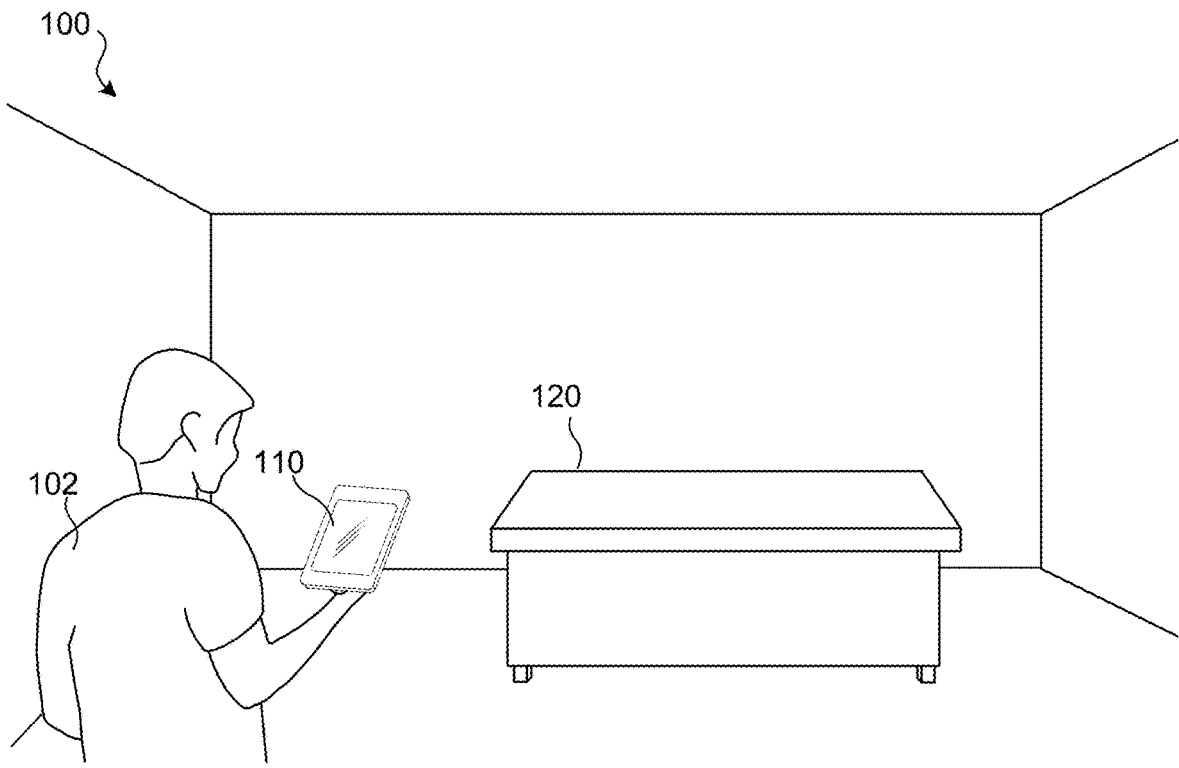
FIGS. 1A-1B illustrate exemplary electronic devices operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1B:
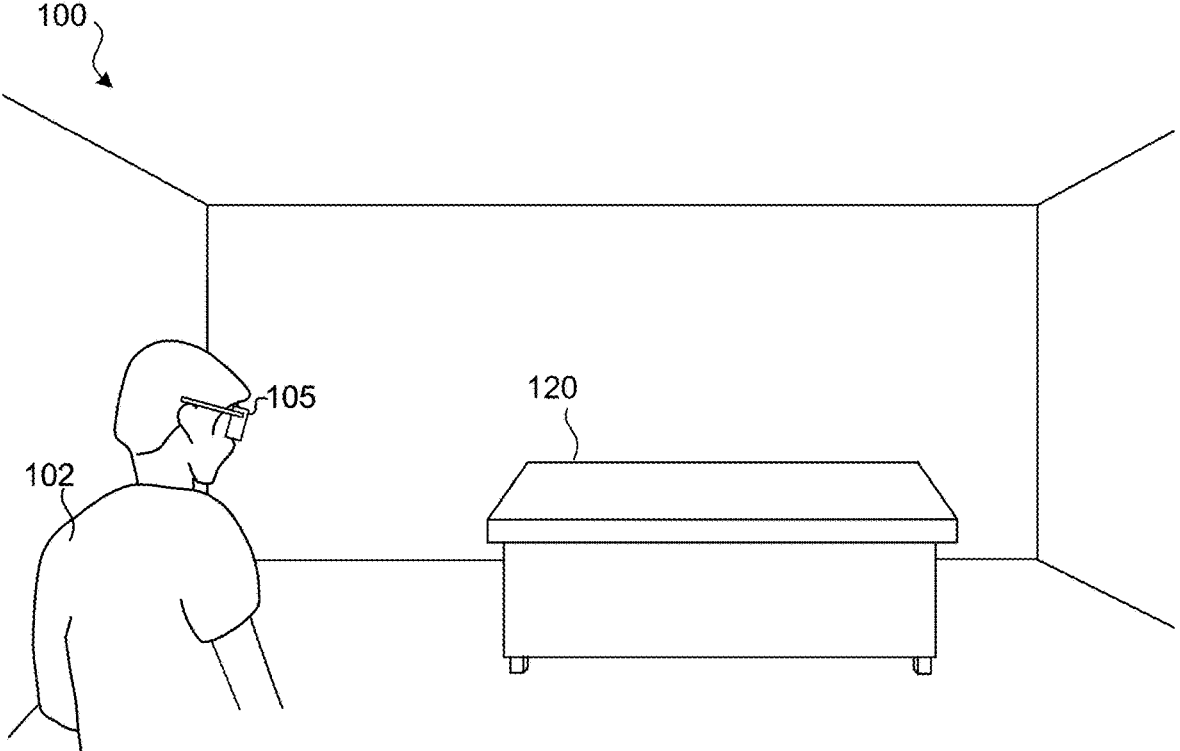

FIGS. 1A-1B illustrate exemplary electronic devices 105 and 110 operating in a physical environment 100. In the example of FIGS. 1A-1B, the physical environment 100 is a room that includes a desk 120. The electronic devices 105 and 110 may include one or more cameras, microphones, depth sensors, or other sensors that can be used to capture information about and evaluate the physical environment 100 and the objects within it, as well as information about the user 102 of electronic devices 105 and 110. The information about the physical environment 100 and/or user 102 may be used to provide visual and audio content and/or to identify the current location of the physical environment 100 and/or the location of the user within the physical environment 100.

In some implementations, views of an extended reality (XR) environment may be provided to one or more participants (e.g., user 102 and/or other participants not shown) via electronic devices 105 (e.g., a wearable device such as an HMD) and/or 110 (e.g., a handheld device such as a mobile device, a tablet computing device, a laptop computer, etc.). Such an XR environment may include views of a 3D environment seen through a transparent or translucent display or a 3D environment that is generated based on camera images and/or depth camera images of the physical environment 100 as well as a representation of user 102 based on camera images and/or depth camera images of the user 102. Such an XR environment may include virtual content that is positioned at 3D locations relative to a 3D coordinate system (e.g., a 3D space) associated with the XR environment, which may correspond to a 3D coordinate system of the physical environment 100.

In some implementations, video (e.g., pass-through video depicting a physical environment) is received from an image sensor of a device (e.g., device 105 or device 110). In some implementations, a 3D representation of a virtual environment is aligned with a 3D coordinate system of the physical environment. A sizing of the 3D representation of the virtual environment may be generated based on, inter alia, a scale of the physical environment or a positioning of an open space, floor, wall, etc. such that the 3D representation is configured to align with corresponding features of the physical environment. In some implementations, a viewpoint within the 3D coordinate system may be determined based on a position of the electronic device within the physical environment. The viewpoint may be determined based on, inter alia, image data, depth sensor data, motion sensor data, etc., which may be retrieved via a virtual inertial odometry system (VIO), a simultaneous localization and mapping (SLAM) system, etc.

FIG. 2 illustrates views, provided via a device, of user interface elements within the 3D physical environment of FIGS. 1A-1B, in which the user performs an interaction (e.g., a direct interaction). In this example, the user 102 makes a hand gesture relative to content presented in views 210*a-b* of an XR environment provided by a device (e.g., device 105 or device 110). The views 210*a-b* of the XR environment include an exemplary user interface 230 of an application (e.g., an example of virtual content) and a representation 220 of the desk 120 (e.g., an example of real content). Providing such a view may involve determining 3D attributes of the physical environment 100 and positioning the virtual content, e.g., user interface 230, in a 3D coordinate system corresponding to that physical environment 100.

In the example of FIG. 2, the user interface 230 includes various content user interface elements, including a background portion 235 and user interface elements 242, 243, 244, 245, 246, 247. The user interface elements 242, 243, 244, 245, 246, 247 may be displayed on the flat two-dimensional (2D) user interface 230. The user interface 230 may be a user interface of an application, as illustrated in this example. In some implementations, an indicator (e.g., a pointer, a highlight structure, etc.) may be used for indicating a point of interaction with any of user interface (visual) elements (e.g., if using a controller device, such as a mouse or other input device). The user interface 230 is simplified for purposes of illustration and user interfaces in practice may include any degree of complexity, any number of content items, and/or combinations of 2D and/or 3D content. The user interface 230 may be provided by operating systems and/or applications of various types including, but not limited to, messaging applications, web browser applications, content viewing applications, content creation and editing applications, or any other applications that can display, present, or otherwise use visual and/or audio content.

In this example, the background portion 235 of the user interface 230 is flat. In this example, the background portion 235 includes all aspects of the user interface 230 being displayed except for the user interface elements 242, 243, 244, 245, 246, 247. Displaying a background portion of a user interface of an operating system or application as a flat surface may provide various advantages. Doing so may provide an easy to understand or otherwise use portion of an XR environment for accessing the user interface of the application. In some implementations, multiple user interfaces (e.g., corresponding to multiple, different applications) are presented sequentially and/or simultaneously within an XR environment, e.g., within one or more colliders or other such components.

In some implementations, the positions and/or orientations of such one or more user interfaces may be determined to facilitate visibility and/or use. The one or more user interfaces may be at fixed positions and orientations within the 3D environment. In such cases, user movements would not affect the position or orientation of the user interfaces within the 3D environment.

The position of the user interface within the 3D environment may be based on determining a distance of the user interface from the user (e.g., from an initial or current user position). The position and/or distance from the user may be determined based on various criteria including, but not limited to, criteria that accounts for application type, application functionality, content type, content/text size, environment type, environment size, environment complexity, environment lighting, presence of others in the environment, use of the application or content by multiple users, user preferences, user input, and numerous other factors.

In some implementations, the one or more user interfaces may be body-locked content, e.g., having a distance and orientation offset relative to a portion of the user's body (e.g., their torso). For example, the body-locked content of a user interface could be 0.5 meters away and 45 degrees to the left of the user's torso's forward-facing vector. If the user's head turns while the torso remains static, a body-locked user interface would appear to remain stationary in the 3D environment at 2 m away and 45 degrees to the left of the torso's front facing vector. However, if the user does rotate their torso (e.g., by spinning around in their chair), the body-locked user interface would follow the torso rotation and be repositioned within the 3D environment such that it is still 0.5 meters away and 45 degrees to the left of their torso's new forward-facing vector.

In other implementations, user interface content is defined at a specific distance from the user with the orientation relative to the user remaining static (e.g., if initially displayed in a cardinal direction, it will remain in that cardinal direction regardless of any head or body movement). In this example, the orientation of the body-locked content would not be referenced to any part of the user's body. In this different implementation, the body-locked user interface would not reposition itself in accordance with the torso rotation. For example, a body-locked user interface may be defined to be 2 m away and, based on the direction the user is currently facing, may be initially displayed north of the user. If the user rotates their torso 180 degrees to face south, the body-locked user interface would remain 2 m away to the north of the user, which is now directly behind the user.

A body-locked user interface could also be configured to always remain gravity or horizon aligned, such that head and/or body changes in the roll orientation would not cause the body-locked user interface to move within the 3D environment. Translational movement would cause the body-locked content to be repositioned within the 3D environment in order to maintain the distance offset.

In the example of FIG. 2, the user 102 moves their hand from an initial position as illustrated by the position of the representation 222 in view 210a. The hand moves along path 250 to a later position as illustrated by the position of the representation 222 in the view 210b. As the user 102 moves their hand along this path 250, the finger intersects the user interface 230. Specifically, as the finger moves along the path 250, it virtually pierces the user interface element 245 and thus a tip portion of the finger (not shown) is occluded in view 210b by the user interface 230.

Implementations disclosed herein interpret user movements such as the user 102 moving their hand/finger along path 250 relative to a user interface element such as user interface element 245 to recognize user input/interactions.

The interpretation of user movements and other user activity may be based on recognizing user intention using one or more recognition processes.

Recognizing input in the example of FIG. 2 may involve determining that a gesture is a direct interaction and then using a direct input recognition process to recognize the gesture. For example, such a gesture may be interpreted as a tap input to the user interface element 245. In making such a gesture, the user's actual motion relative to the icon 245 may deviate from an ideal motion (e.g., a straight path through the center of the user interface element in a direction that is perfectly orthogonal to the plane of the user interface element). The actual path may be curved, jagged, or otherwise non-linear and may be at an angle rather than being orthogonal to the plane of the user interface element. The path may have attributes that make it similar to other types of input gestures (e.g., swipes, drags, flicks, etc.) For example, the non-orthogonal motion may make the gesture similar to a swipe motion in which a user provides input by piercing a user interface element and then moving in a direction along the plane of the user interface.

Some implementations disclosed herein determine that a direct interaction mode is applicable and, based on the direct interaction mode, utilize a direct interaction recognition process to distinguish or otherwise interpret user activity that corresponds to direct input, e.g., identifying intended user interactions, for example, based on if, and how, a gesture path intercepts one or more 3D regions of space. Such recognition processes may account for actual human tendencies associated with direct interactions (e.g., natural arcing that occurs during actions intended to be straight, tendency to make movements based on a shoulder or other pivot position, etc.), human perception issues (e.g., user's not seeing or knowing precisely where virtual content is relative to their hand), and/or other direct interaction-specific issues.

Note that the user's movement in the real world (e.g., physical environment 100) correspond to movements within a 3D space, e.g., an XR environment that is based on the real-world and that includes virtual content such as user interface positioned relative to real-world objects including the user. Thus, the user is moving his hand in the physical environment 100, e.g., through empty space, but that hand (e.g., a depiction or representation of the hand) intersects with and/or pierces through the user interface 300 of the XR environment that is based on that physical environment. In this way, the user virtually interacts directly with the virtual content.

FIG. 3 illustrates an exemplary view, provided via a device, of user interface elements within the 3D physical environment of FIGS. 1A-1B in which the user performs an interaction (e.g., an indirect interaction based on gaze and pointing). In this example, the user 102 makes a hand gesture while looking at content presented in the view 302 of an XR environment provided by a device (e.g., device 105 or device 110). The view 302 of the XR environment includes the exemplary user interface 230 FIG. 2. In the example of FIG. 3, the user 102 makes a pointing gesture with their hand as illustrated by the representation 222 while gazing along gaze direction 310 at user interface icon 246 (e.g., a star shaped application icon or widget). In this example, this user activity (e.g., a pointing hand gesture along with a gaze at a user interface element) corresponds to a user intention to interact with user interface icon 246, e.g., the point signifies a potential intention to interact and the gaze (at the point in time of the point) identifies the target of the interaction (e.g., waiting for the system to highlight the icon to indicate to the user of the correct target before initiating an interaction from another user activity, such as via a pinch gesture).

Implementations disclosed herein interpret user activity, such as the user 102 with a pointing hand gesture along with a gaze at a user interface element, to recognize user/ interactions. For example, such user activity may be interpreted as a tap input to the user interface element 246, e.g., selecting user interface element 246. However, in performing such actions, the user's gaze direction and/or the timing between a gesture and gaze with which the user intends the gesture to be associated may be less than perfectly executed and/or timed.

Some implementations disclosed herein determine that an indirect interaction mode is applicable and, based on the indirect interaction mode, utilize an indirect interaction recognition process to identify intended user interactions based on user activity, for example, based on if, and how, a gesture path intercepts one or more 3D regions of space. Such recognition processes may account for actual human tendencies associated with indirect interactions (e.g., eye saccades, eye fixations, and other natural human gaze behavior, arching hand motion, retractions not corresponding to insertion directions as intended, etc.), human perception issues (e.g., user's not seeing or knowing precisely where virtual content is relative to their hand), and/or other indirect interaction-specific issues.

Some implementations determine an interaction mode, e.g., a direct interaction mode or indirect interaction mode, so that user behavior can be interpreted by a specialized (or otherwise separate) recognition process for the appropriate interaction type, e.g., using a direct interaction recognition process for direct interactions and an indirect interaction recognition process or indirect interactions. Such specialized (or otherwise separate) process utilization may be more efficient, more accurate, or provide other benefits relative to using a single recognition process configured to recognize multiple types (e.g., both direct and indirect) interactions.

FIGS. 2 and 3 illustrate example interaction modes that are based on user activity within a 3D environment. Other types or modes of interaction may additionally or alternatively be used including but not limited to user activity via input devices such as keyboards, trackpads, mice, hand-held controllers, and the like. In one example, a user provides an interaction intention via activity (e.g., performing an action such as tapping a button or a trackpad surface) using an input device such as a keyboard, trackpad, mouse, or hand-held controller and a user interface target is identified based on the user's gaze direction at the time of the input on the input device. Similarly, user activity may involve voice commands. In one example, a user provides an interaction intention via activity (e.g., performing an action such as tapping a button or a trackpad surface) using an input device such as a keyboard, trackpad, mouse, or hand-held controller and a user interface target is identified based on the user's gaze direction at the time of the voice command. In another example, user activity identifies an intention to interact (e.g., via a pinch, hand gesture, voice command, input-device input, etc.) and a user interface element is determined based on a non-gaze-based direction, e.g., based on where the user is pointing within the 3D environment. For example, a user may pinch with one hand to provide input indicating an intention to interact while pointing at a user interface button with a finger of the other hand. In another example, a user may manipulate the orientation of a hand-held device in the 3D environment to control a controller direction (e.g., a virtual line extending from controller within the 3D environment) and a user interface element with respect to which the user is interacting may be identified based on the controller direction, e.g., based on identifying what user interface element the controller direction intersects with when input indicating an intention to interact is received.

Various implementations disclosed herein provide an input support process, e.g., as an OS process separate from an executing application, that processes user activity data (e.g., regarding gaze, hand gestures, other 3D activities, HID inputs, etc.) to produce data for an application that the application can interpret as user input. The application may not need to have 3D input recognition capabilities, as the data provided to the application may be in a format that the application can recognize using 2D input recognition capabilities, e.g., those used within application developed for use on 2D touch-screen and/or 2D cursor-based platforms. Accordingly, at least some aspects of interpreting user activity for an application may be performed by processes outside of the application. Doing so may simplify or reduce the complexity, requirements, etc. of the application's own input recognition processes, ensure uniform, consistent input recognition across multiple, different applications, protect private use data from application access, and numerous other benefits as described herein.

FIG. 4 illustrates an exemplary interaction tracking the movements of two hands 422, 424 of the user 102, and a gaze along the path 410, as the user 102 is virtually interacting with a user interface element 415 of a user interface 400. In particular, FIG. 4 illustrates an interaction with user interface 400 as the user is facing the user interface 400. In this example, the user 102 is using device 105 to view and interact with an XR environment that includes the user interface 400. An interaction recognition process (e.g., direct or indirection interaction) may use sensor data and/or user interface information to determine, for example, which user interface element the user's hand is virtually touching, which user interface element the user intends to interact with, and/or where on that user interface element the interaction occurs. Direct interaction may additionally (or alternatively) involve assessing user activity to determine the user's intent, e.g., did the user intend to a straight tap gesture through the user interface element or a sliding/scrolling motion along the user interface element. Additionally, recognition of user intent may utilize information about the user interface elements. For example, determining user intent with respect to user interface elements may include the positions, sizing, and type of element, types of interactions that are capable on the element, types of interactions that are enabled on the element, which of a set of potential target elements for a user activity accepts which types of interactions, and the like.

Various two-handed gestures may be enabled based on interpreting hand positions and/or movements using sensor data, e.g., image or other sensor data captured by outward facing sensors on an HMD, such as device 105. For example, a pan gesture may be performed by pinching both hands and then moving both hands in the same direction, e.g., holding the hands out at a fixed distance apart from one another and moving them both an equal amount to the right to provide input to pan to the right. In another example, a zoom gesture may be performed by holding the hands out and moving one or both hands to change the distance between the hands, e.g., moving the hands closer to one another to zoom in and farther from one another to zoom out.

Additionally, or alternatively, in some implementations, recognition of such an interaction of two hands may be based on functions performed both via a system process and via an application process. For example, an OS's input support process may interpret hands data from the device's sensors to identify an interaction event and provide limited or interpreted information about the interaction event to the application that provided the user interface 400. For example, rather than providing detailed hand information (e.g., identifying the 3D positions of multiple joints of a hand model representing the configuration of the hand 422 and hand 424), the OS input support process may simply identify a 2D point within the 2D user interface 400 on the user interface element 415 at which the interaction occurred, e.g., an interaction pose. The application process can then interpret this 2D point information (e.g., interpreting it as a selection, mouse-click, touch-screen tap, or other input received at that point) and provide a response, e.g., modifying its user interface accordingly.

In some implementations, hand motion/position may be tracked using a changing shoulder-based pivot position that is assumed to be at a position based on a fixed offset from the device's 105 current position. The fixed offset may be determined using an expected fixed spatial relationship between the device and the pivot point/shoulder. For example, given the device's 105 current position, the shoulder/pivot point may be determined at position X given that fixed offset. This may involve updating the shoulder position over time (e.g., every frame) based on the changes in the position of the device over time. The fixed offset may be determined as a fixed distance between a determined location for the top of the center of the head of the user 102 and the shoulder joint.

FIGS. 5A, 5B, 6A, 6B, 7A-7D, 8A, 8B, 9A, and 9B illustrate different examples of tracking user activity (e.g., movements of the hands, gaze, etc.) during an interaction of a user attempting to perform a gesture (e.g., user's intent (attention) directed at the user interface element) in order to provide a graphical indication (e.g., a visual effect) to highlight the user interface element that matches the shape of the user interface element the user is focused on. For example, each figure illustrates identifying the position of an object (e.g., a user interface element) based on tracking a portion of the user (e.g., a hand of user) using sensors (e.g., outward facing image sensors) on a head-mounted device, such as device 105 as the user is moving in the environment and interacting with an environment (e.g., an XR environment). For example, the user may be viewing an XR environment, such as XR environment 205 illustrated in FIG. 2 and/or XR environment 305 illustrated in FIG. 3, and interacting with elements within the application window of the user interface (e.g., user interface 230) as a device (e.g., device 105) tracks the hand movements and/or gaze of the user 102. The user activity tracking system can then determine if the user is trying to interact with particular user interface elements. The user interface object may be virtual content that an application window can allow the user to interact with, and the user activity tracking system can determine whether the user is interacting with any particular element or performing a particular motion in a 3D coordinate space such as performing a zoom gesture. For example, hand representation 222 represents the user's 102 left hand and hand representation 224 represents the user's 102 right hand as the user is looking at a user interface or an object at first instance in time and is performing a user interaction event. As the user activity indicates an interaction with a particular object (e.g., a user interface element) for a second instance in time, the application can initiate an identified action (e.g., provide a graphical indication for the determined intended user interface element). In some implementations, the user activity tracking system can track hand movements based on the movement of one or more points as the user moves his or her hands (e.g., hand representations 222, 224), and the application can perform actions (e.g., zoom, rotate, move, pan, etc.) based on the detected movements of the two hands.

FIGS. 5A and 5B illustrate an example of interaction recognition of user activity (e.g., of user 102 of FIGS. 1A-1B) with a user interface element and displaying a graphical indication based on a determined shape of a user interface element, in accordance with some implementations. FIGS. 5A and 5B are presented in views 510A and 510B, respectively, of an XR environment provided by electronic device 105 and/or electronic device 110 of FIGS. 1A-1B. The views 510A-B of the XR environment 505 includes a view of the representation 220 as the user 102 is interacting with a user interface element 246 of the user interface 230 (e.g., an icon for an application that is shaped as a star). In particular, FIG. 5A illustrates view 510A, for a first instance in time, of a user's 102 intent (attention) directed at the user interface element 246 as illustrated by the left hand pointing (e.g., hand representation 222) and a gaze along the path 502. FIG. 5B illustrates view 510B, for a second instance in time, of a graphical indication 520 that is matched with the shape of the user interface element 246 and based on the determined user's 102 intent based on the user activity illustrated in FIG. 5A (e.g., intent or focus on user interface element 246). The graphical indication 520 provides a visual effect or glow that matches the shape of the user interface element 246 as opposed to displaying a generic or standard shape highlight, such as a square. Thus, a star shaped highlight (graphical indication 520) appears glowing or some other type of visual effect behind the star shaped user interface element 246 to indicate to the user 102 that the system recognizes the user intent to interact with the application associated with user interface element 246.

FIGS. 6A and 6B illustrate an example of interaction recognition of user activity (e.g., of user 102 of FIGS. 1A-1B) with a user interface element and displaying a graphical indication based on a determined shape of a user interface element, in accordance with some implementations. FIGS. 6A and 6B are presented in views 610A and 610B, respectively, of an XR environment provided by electronic device 105 and/or electronic device 110 of FIGS. 1A-1B. The views 610A-B of the XR environment 605 includes a view of the representation 220 as the user 102 is interacting with a user interface element 245 of the user interface 230 (e.g., an icon for an application that is shaped as a building). In particular, FIG. 6A illustrates view 610A, for a first instance in time, of a user's 102 intent (attention) directed at the user interface element 246 as illustrated by the left hand pointing (e.g., hand representation 222) and a gaze along the path 602. FIG. 6B illustrates view 610B, for a second instance in time, of a graphical indication 620 that is matched with the shape of the user interface element 245 and based on the determined user's 102 intent based on the user activity illustrated in FIG. 6A (e.g., intent or focus on user interface element 245). The graphical indication 620 provides a visual effect or glow that matches the shape of the user interface element 245 as opposed to displaying a generic or standard shape highlight, such as a square. In other words, the outline shape of the object of the user interface element 245 (the building) is matched and the graphical indication 620 is expanded and presented as appearing as a separate 2D window or layer that appears larger and behind the user interface element 245. Thus, the building-shaped highlight (graphical indication 620) appears glowing or some other type of visual effect behind the user interface element 246 to indicate to the user 102 that the system recognizes the user intent to interact with the application associated with user interface element 245.

FIGS. 7A-7D illustrate an example of interaction recognition of user activity (e.g., of user 102 of FIGS. 1A-1B) with a user interface element and displaying a graphical indication based on a determined shape of a user interface element, in accordance with some implementations. FIG. 7A-7D are presented in views 710A-710D, respectively, of an XR environment provided by electronic device 105 and/or electronic device 110 of FIGS. 1A-1B. The views 710A-710D of the XR environment 705 includes a view of the representation 220 as the user 102 is interacting with a user interface element 247 of the user interface 230 (e.g., an icon for an application that is shaped with concentric circles).

Figures 7A, 7B:
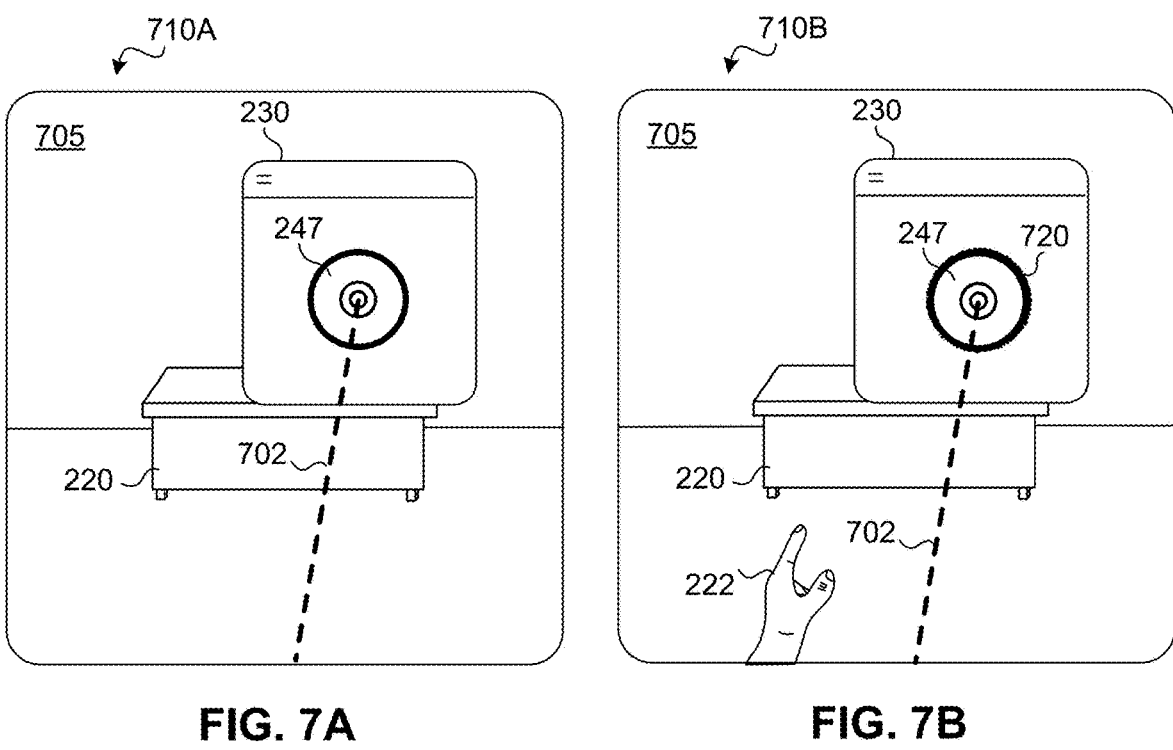
FIGS. 7A-7D illustrate views of an example of interaction recognition of user activity and displaying a graphical indication based on a determined shape of a user interface element, in accordance with some implementations.

In particular, FIG. 7A illustrates view 710A, for a first instance in time, of a user's 102 intent (attention) directed at the user interface element 247 as illustrated by a gaze along the path 702 directed towards user interface element 247 (e.g., the user 102 makes a first glance at the icon). FIG. 7B illustrates view 710B, for a second instance in time, as illustrated by the left hand pointing (e.g., hand representation 222) in conjunction with the gaze along the path 702 (e.g., the user 102 continues to focus and now point at the icon). FIG. 7B also illustrates a graphical indication 720 that is matched with the outside circular shape of the user interface element 247 and based on the determined user's 102 intent based on the user activity illustrated in FIG. 7A (e.g., gaze upon user interface element 245) and based on the user activity illustrated in FIG. 7B (e.g., gaze and finger pointing upon user interface element 245). The graphical indication 720 provides a visual effect or glow that matches the shape of the user interface element 247. In other words, the outline shape of the object of the user interface element 247 (the outside circle of the concentric circles) is matched and the graphical indication 720 is expanded and presented as appearing as a separate 2D window or layer that appears larger and behind the user interface element 247. Thus, the circular-shaped highlight (graphical indication 720) appears glowing or some other type of visual effect behind the user interface element 247 to indicate to the user 102 that the system recognizes the user intent to interact with the application associated with user interface element 247.

Figures 7C, 7D:
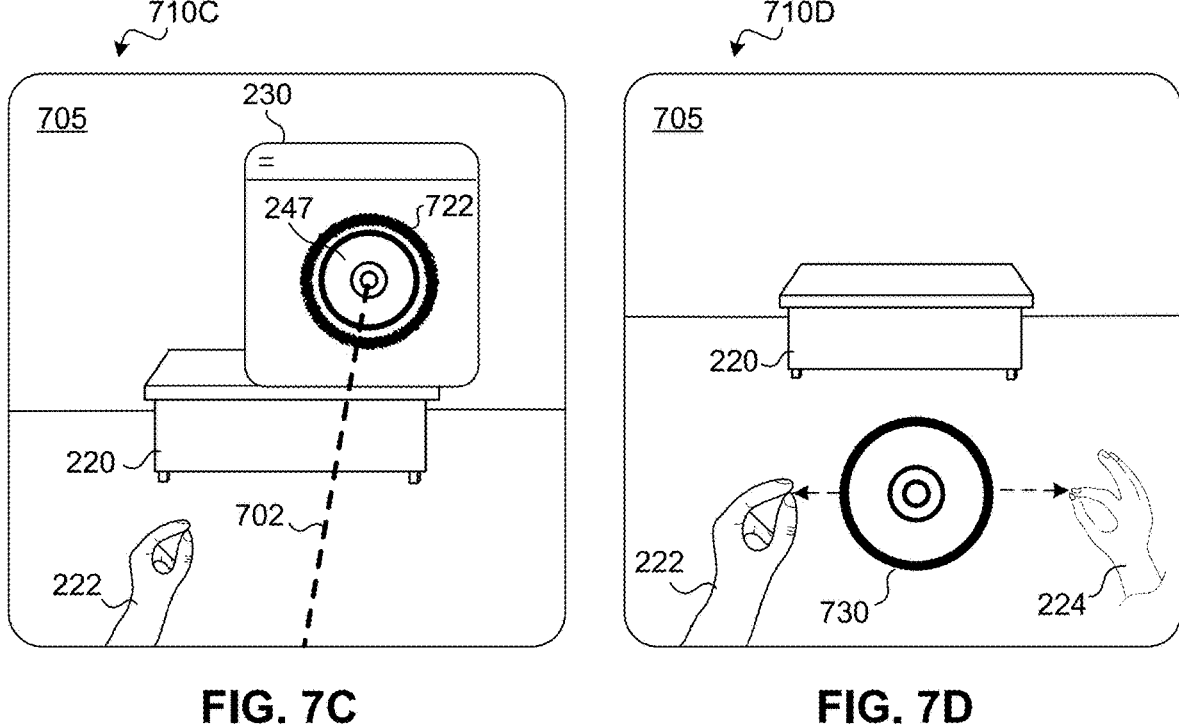

FIG. 7C illustrates view 710C, for a third instance in time, as illustrated by the left-hand pinching (e.g., hand representation 222) in conjunction with the gaze along the path 702. For example, the user 102 continues to focus and now perform an action towards the icon such as a pinch, that may trigger an action by an application associated with user interface element 247, as illustrated in FIG. 7D. FIG. 7C also illustrates the graphical indication 722 is matched with the outside circular shape of the user interface element 247, but is larger than the graphical indication 720 of FIG. 7B. In some implementations, the graphical indication may change in an appearance or other attributes (e.g., getting larger, flashing, fluctuating in size, changing color, etc.) over time. Thus, as illustrated between the second instance of time in FIG. 7B to the third instance of time in FIG. 7C (e.g., a few milliseconds up to one or two seconds or more) the size of the first graphical indication 720 increases to the second graphical indication 722. In other words, as the user's intent stays focused during a period of time on the same item (e.g., user interface element 247), the visual effects will reflect that change to indicate to the user what element the system determines is the intent of the user to interact with. FIG. 7D illustrates view 710D, for a fourth instance in time, as illustrated by the left-hand pinching (e.g., hand representation 222) and the right-hand pinching (e.g., hand representation 224) and interacting with an application 730 associated with the user interface element 247. In other words, the pinching action in FIG. 7C for the third instance of time, triggered the application 730 associated with the user interface element 247, and then the view 710 removes the view of the user interface 230 and user interface element 247 and only displays the application 730 for the user 102 to interact with.

FIGS. 8A and 8B illustrate an example of interaction recognition of user activity (e.g., of user 102 of FIGS. 1A-1B) with a user interface element associated with a photographic element and displaying a graphical indication based on a determined shape of the photographic element, in accordance with some implementations. FIGS. 8A and 8B are presented in views 810A and 810B, respectively, of an XR environment provided by electronic device 105 and/or electronic device 110 of FIGS. 1A-1B. The views 810A-B of the XR environment 805 includes a view of the representation 220 of the desk 120 and a user interface 830 (e.g., a photo gallery application) that includes a series of digital images, e.g., user interface elements 812, 814, 816, 818, each are of various quality (e.g., resolution, entropy, size in dimensions, data size, etc.). Additionally, the user 102 is interacting with (e.g., looking at and pointing to) a particular photo, user interface elements 816 of the user interface 830 (e.g., a higher resolution digital photographic image of a person). In particular, FIG. 8A illustrates view 810A, for a first instance in time, of a user's 102 intent (attention) directed at the user interface element 816 as illustrated by the left hand pointing (e.g., hand representation 222) and a gaze along the path 802. FIG. 8B illustrates view 810B, for a second instance in time, of a graphical indication 820 and graphical indication 822 based on matching with the shape of the user interface element 816 and based on the determined user's 102 intent in response to the user activity illustrated in FIG. 8A (e.g., intent or focus on user interface element 816). For example, the graphical indication 820 provides an initial visual effect or glow that surrounds the persons face, and graphical indication 822 provides a visual effect or glow that applies one or more photographic visual effects that is matched to the shape of the person's face. Determining to provide the photographic visual effects (e.g., graphical indication 822) may be based on determining that the element is a photograph and that the user interface element 816 meets or exceeds one or more confidence thresholds associated with photographs (e.g., resolution threshold, entropy threshold, data size threshold, size threshold with respect to a current view, and the like). In other words, based on a higher quality image, a higher quality visual effect is applied (e.g., graphical indication 822 for the person's face). Additionally, a photograph indicator of an oval shaped highlight (graphical indication 820) appears glowing around the image of the person's head or some other type of visual effect behind the user interface element 816 to indicate to the user 102 that the system recognizes the user intent to interact with the application associated with user interface element 816 (e.g., to increase the size of the image, move to another position within the environment 905, etc.).

FIGS. 9A and 9B illustrate an example of interaction recognition of user activity (e.g., of user 102 of FIGS. 1A-1B) with a user interface element associated with a photographic element and displaying a graphical indication based on a determined shape of the photographic element, in accordance with some implementations. FIGS. 9A and 9B are presented in views 910A and 910B, respectively, of an XR environment provided by electronic device 105 and/or electronic device 110 of FIGS. 1A-1B. The views 910A-B of the XR environment 905 includes a view of the representation 220 of the desk 120 and a user interface 830 (e.g., a photo gallery application) that includes a series of digital images, e.g., user interface elements 812, 814, 816, 818, that each are of various quality (e.g., resolution, entropy, size in dimensions, data size, etc.). Additionally, the user 102 is interacting with (e.g., looking at and pointing to) a particular photo, user interface elements 818 of the user interface 830 (e.g., a lower resolution digital photographic image of a person and a house). In particular, FIG. 9A illustrates view 910A, for a first instance in time, of a user's 102 intent (attention) directed at the user interface element 818 as illustrated by the left hand pointing (e.g., hand representation 222) and a gaze along the path 902. FIG. 9B illustrates view 910B, for a second instance in time, of a graphical indication 920 that matches the shape of the user interface element 818 and is based on the determined user's 102 intent in response to the user activity illustrated in FIG. 9A (e.g., intent or focus on user interface element 818). For example, compared to graphical indication 820 and 822 of FIG. 8B, the graphical indication 920 provides another example of a photographic visual effect or glow that is matched to the outside shape of the person and the house of the photograph. Determining to provide the photographic visual effects (e.g., graphical indication 920) may be based on determining that the element is a photograph and that the user interface element 818 is less than one or more confidence thresholds associated with photographs (e.g., resolution threshold, entropy threshold, data size threshold, size threshold with respect to a current view, and the like). In other words, based on a lower quality image, a lower quality visual effect is applied For example, the graphical indication 920 matches the outside shape of the image of the user interface element 818 to indicate to the user 102 that the system recognizes the user's intent to interact with the photograph associated with user interface element 816 (e.g., to increase the size of the image, move to another position within the XR environment 905, etc.)

In some implementations, determining a shape may be based on consolidating elements of a single interactive item (e.g., different layers/elements corresponding to what the user perceives as a single element). For example, user interface element 818 appears as one photograph of a house and a person. However, in some implementations, the user interface element 818 may be two 2D layered photographs that overlap (e.g., the person overlaps the house, but not entirely). In that case, the shape determination process may take into account the outside shape of both elements but consolidated as one element, thus the graphical indication 920 goes further below the house by the person on the bottom left side, even though the user may only be focused on the house.

Figures 10, 11:
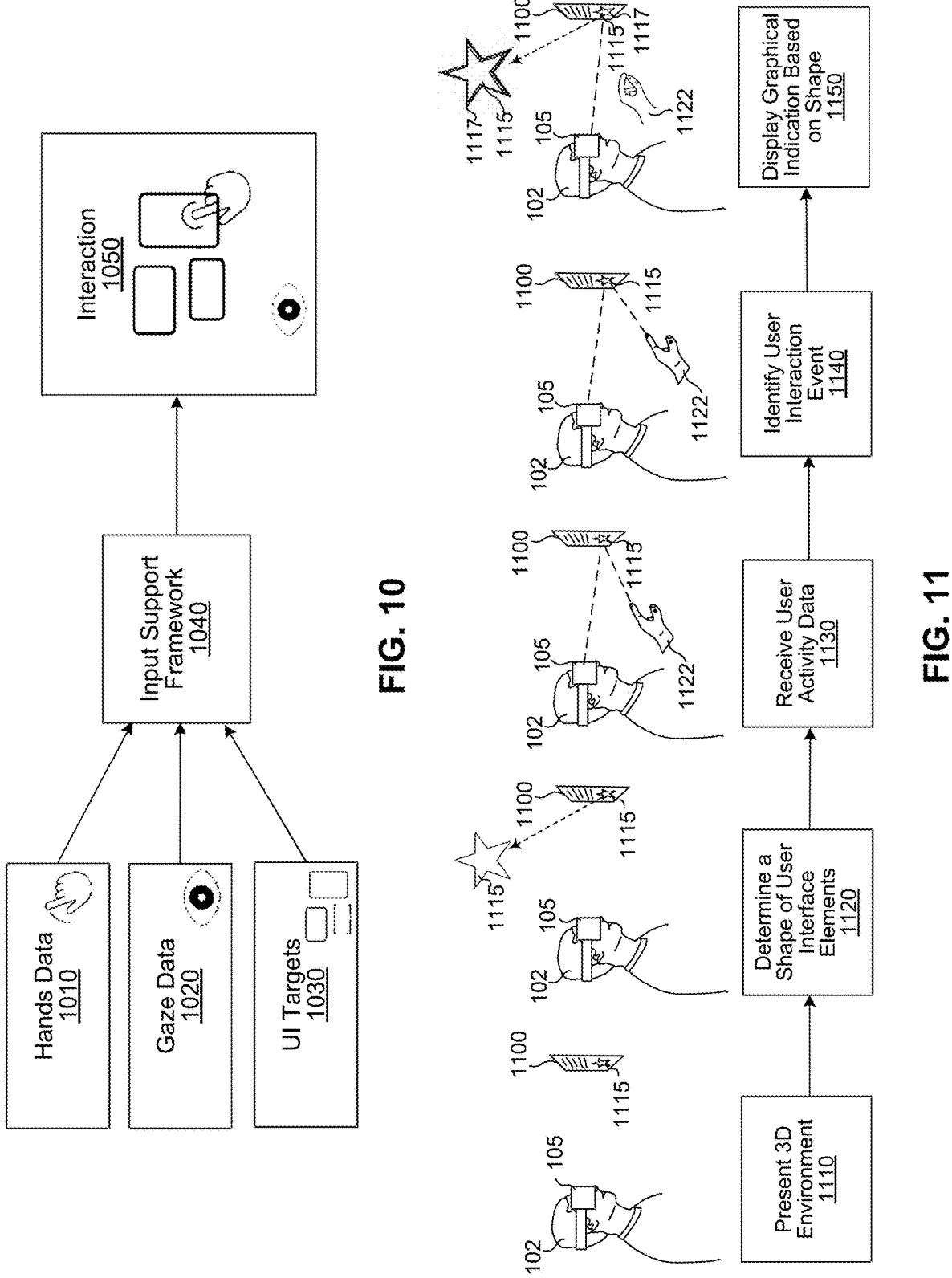
FIG. 10 illustrates use of an exemplary input support framework to generate interaction data based on hands and gaze data and user interface target data, in accordance with some implementations.
FIG. 11 illustrates an example of interaction recognition of user activity and displaying a graphical indication based on a determined shape of a user interface element in accordance with some implementations.

FIG. 10 illustrates use of an exemplary input support framework 1040 to generate interaction data based on hands data 1010, gaze data 1020, and user interface target data 1030 to produce interaction data 1050 that can be provided to one or more applications and/or used by system processes to provide a desirable user experience. In some implementations, the input support process 1040 is configured to understand a user's intent to interact, generate input signals and events to create reliable and consistent user experiences across multiple applications, detect input out-of-process and route it through the system responsibly. The input support process 1040 may arbitrate which application, process, and/or user interface element should receive user input, for example, based identifying which application or user interface element is the intended target of a user activity. The input support process 1040 may keep sensitive user data, e.g., gaze, hand/body enrollment data, etc., private; only sharing abstracted or high-level information with applications.

The input support process may take hands data 1010, gaze data 1020, and user interface target data 1030 and determine user interaction states. In some implementations, it does so within a user environment in which multiple input modalities are available to the user, e.g., an environment in which a user can interact directly as illustrated in FIG. 2 or indirectly as illustrated in FIG. 3 to achieve the same interactions with user interface elements. For example, the input support process may determine that the user's right hand is performing an intentional pinch and gaze interaction with a user interface element, that the left hand is directly tapping a user interface element, or that the left hand is fidgeting and therefor idle/doing nothing relevant to the user interface. In some implementations, the user interface target data 1030 includes information associated with user interface elements, such as scalable vector graphics (SVG) information for vector graphics (e.g., may have some information from the basic shapes, paths, or may contain masks or clip paths) and/or other image data (e.g., RGB data or image metadata for bitmap images).

Based on determining a user intent to interact, the input support framework 1040 may generate interaction data 1050 (e.g., including an interaction pose, manipulator pose, and/or interaction state). The input support framework may generate input signals and events that applications may consume without needed custom or 3D input recognition algorithms in process. In some implementations, the input support framework provides interaction data 1050 in a format that an application can consume as a touch event on a touch screen or as track pad tap with a 2D cursor at a particular position. Doing so may enable the same application (with little or no additional input recognition processes) to interpret interactions across different environments including new environment for which an application was not originally created and/or using new and different input modalities. Moreover, application responses to input may be more reliable and consistent across applications in a given environment and across different environments, e.g., enabling consistent user interface responses for 2D interactions with the application on tablets, mobile devices, laptops, etc. as well as for 3D interactions with the application on an HMD and/or other 3D/XR devices.

The input support framework may also manage user activity data such that different apps are not aware of user activity relevant to other apps, e.g., one application will not receive user activity information while a user types a password into another app. Doing so may involve the input support framework accurately recognizing to which application a user's activity corresponds and then routing the interaction data 1050 to only the right application. An application may leverage multiple processes for hosting different user interface elements (e.g., using an out-of-process photo picker) for various reasons (e.g., privacy). The input support framework may accurately recognize to which process a user's activity corresponds and route the interaction data 1050 to only the right process. The input support framework may use details about the UIs of multiple, potential target apps and/or processes to disambiguate input.

FIG. 11 illustrates an example of interaction recognition of user activity and displaying a graphical indication based on a determined shape of a user interface element. In this example, sensor data on device 105 and/or user interface information are used to recognize a user interaction made by user 102, e.g., based on outward-facing image sensor data, depth sensor data, eye sensor data, motion sensor data, etc. and/or information made available by an application providing the user interface. Sensor data may be monitored to detect user activity corresponding to an engagement condition corresponding to the start of a user interaction.

In this example, at block 1110, the process presents a 3D environment (e.g., an XR environment) that includes a view of a user interface 1100 that includes virtual elements/objects (e.g., user interface element 1115). At block 1120, the process determines a shape of the user interface elements (e.g., user interface element 1115). In this example, the process determines that user interface element 1115 is an interactive element and matches the shape of the outside portion or edge of the user interface element 1115, which, in this example, is a star shaped element. In some implementations, determining a shape may be based on information associated with the webpage or user interface 1100 such as SVG information for vector graphics and/or other image data. For example, there may be some information from the basic shapes, paths, or may contain masks or clip paths of the user interface element 1115. Additionally, or alternatively, other image data associated with the user interface element 1115 may include RGB data or image metadata for bitmap images. In some implementations, determining a shape may be based on image maps or other image recognition techniques for recognizing photo items.

In some implementations, determining a shape may be based on consolidating elements of a single interactive item (e.g., different layers/elements corresponding to what the user perceives as a single element). For example, the concentric circles of the element 247 maybe different layers of multiple elements that may then be viewed as a consolidated single 2D element to determine the outside shape of the consolidated element. Another example would be user interface element 818 of a house and a person. If the user interface element 818 was two elements that overlap (e.g., the person overlaps the house, but not entirely) than the shape determination process takes into account that outside shape of both elements but consolidated as one element, thus the graphical indication 920 goes further below the house by the person on the bottom left side.

At block 1130 the process receives user activity data such as hands data and/or gaze information (e.g., gaze direction 1105 of user 102). In an exemplary implementation, the process may detect that the user 102 has positioned a hand 1122 within view of outward facing image sensors. In some implementations, the process may detect one or more particular one-handed or two-handed configurations, e.g., a claw shape, a pinch, a point, a flat hand, a steady hand in any configuration, etc., as an indication of hand engagement or may simply detect the presence of the hand within sensor view to initiate a process.

At block 1140, the process identifies a user interaction event with a user interface element. In this example, the process identifies that the gaze direction 1105 of user 102 and a pointing direction of the hand 1122 is on user interface element 1115 (or any other object within a view of an XR environment). However, the process may identify the object (e.g., user interface element 1115) based only on gaze or only on hand activity.

At block 1150, the process displays a graphical indication based on the identified shape of the user interface element. In other words, the process matches the graphical indication 1117 to the determined shape of the user interface element 1115 rather than using a predefined shape (e.g., rectangle that surrounds a circular element). In this example, the graphical indication 1117 (e.g., a visual effect that provides feedback), a star shaped glow or highlight, distinguishes user interface element 1115 graphically to indicate that the user interface element 1115 now has a different state (e.g., a "hover" state that is analogous to the state of a traditional user interface icon when a cursor is on the item without clicking/tapping).

Furthermore, at block 1150, the process may recognize a gesture to be associated with the identified object and may update the object (or initiate an application associated with the object) based on the pose(s) of hand 1122. In this example, the user 102 is gazing at user interface element 1115 while making a pinching gesture by hand 1122, which may be interpreted to initiate an action upon the user interface element 1115, e.g., causing a selection action that is analogous to a "click" event of a traditional user interface icon during which a cursor is positioned on an icon and a trigger such as a mouse click or track pad tap is received or similarly analogous to a touch screen "tap" event.

In some implementations, the application that provided the user interface information need not be notified of the hover state and associated feedback provided by the graphical indication 1117. Instead, the hand engagement, object identification, and display of feedback can be handled out of a process (e.g., outside of the application process), e.g., by the operating system processes. For example, such processes may be provided via an operating system's input support process. Doing so may reduce or minimize potentially sensitive user information (e.g., such as constant gaze direction vectors or hand motion direction vectors) that might otherwise be provided to application to enable the application to handle these functions within the application process. Whether and how to display feedback may be specified by the application even though it is carried out of a process. For example, the application may define that an element should display hover or highlight feedback and define how the hover or highlight will appear such that the out of process aspect (e.g., operating system) may provide the hover or highlight according to the defined appearance. Alternatively, feedback can be defined out-of-process (e.g., solely by the OS) or defined to use a default appearance/animation if the application does not specify an appearance.

Recognition of such an interaction with a user interface element may be based on functions performed both via a system process and via an application process. For example, an OS's input process may interpret hands and optionally gaze data from the device's sensors to identify an interaction event and provide limited or interpreted/abstracted information about the interaction event to the application that provided the user interface 1100. For example, rather than providing gaze direction information identifying gaze direction 1105, the OS input support process may identify a 2D point within the 2D user interface 1100 on the user interface element 1115, e.g., an interaction pose. The application process can then interpret this 2D point information (e.g., interpreting it as a selection, mouse-click, touch-screen tap, or other input received at that point) and provide a response, e.g., modifying its user interface accordingly.

FIG. 11 illustrates examples of recognizing indirect user interactions in order to determine whether or not to display graphical indications as feedback (e.g., hover). Numerous other types of indirect interactions can be recognized, e.g., based on one or more user actions identifying a user interface element and/or one or more user actions providing input (e.g., no-action/hover type input, selection type input, input having a direction, path, speed, acceleration, etc.). Input in 3D space that is analogous to input on 2D interfaces may be recognized, e.g., input analogous to mouse movements, mouse button clicks, touch screen touch events, trackpad events, joystick events, game controller events, etc.

Some implementations utilize an out of process (e.g., outside of an application process) input support framework to facilitate accurate, consistent, and efficient input recognition in a way that preserves private user information. For example, aspects of the input recognition process may be performed out of process such that applications have little or no access to information about where a user is looking, e.g., gaze directions. In some implementations, application access to some user activity information (e.g., gaze direction-based data) is limited to only a particular type of user activity, e.g., activity satisfying particular criteria. For example, applications may be limited to receive only information associated with deliberate or intentional user activity, e.g., deliberate or intentional actions indicative of an intention to interact with (e.g., select, activate, move, etc.) a user interface element.

Some implementations recognize input using functional elements performed both via an application process and a system process that is outside of the application process. Thus, in contrast to a framework in which all (or most) input recognition functions are managed within an application process, some algorithms involved in the input recognition may be moved out of process, e.g., outside of the application process. For example, this may involve moving algorithms that detect gaze input and intent out of an application's process such that the application does not have access to user activity data corresponding to where a user is looking or only has access to such information in certain circumstances, e.g., only for specific instances during which the user exhibits an intent to interact with a user interface element.

Some implementations recognize input using a model in which an application declares or otherwise provides information about its user interface elements so that a system process that is outside of the application process can better facilitate input recognition. For example, an application may declare the locations and/or user interface behaviors/capabilities of its buttons, scroll bars, menus, objects, and other user interface elements. Such declarations may identify how a user interface should behave given different types of user activity, e.g., this button should (or should not) exhibit hover feedback when the user looks at it.

The system process (e.g., outside of the application process) may use such information to provide the desired user interface behavior (e.g., providing hover feedback with a graphical indication in appropriate user activity circumstances). For example, the system process may trigger the graphical indication (hover feedback) for a user interface element based on a declaration from the application that the app's user interface includes the element and that it should display hover feedback, e.g., when gazed upon. The system process may provide such hover feedback based on recognizing the triggering user activity (e.g., gaze at the user interface object) and may do so without revealing to the application the user activity details associated with the user activity that triggered the hover, the occurrence of the user activity that triggered the hover feedback, and/or that the hover feedback was provided. The application may be unaware of the user's gaze direction and/or that hover feedback was provided for the user interface element.

Some aspects of input recognition may be handled by the application itself, e.g., in process. However, the system process may filter, abstract, or otherwise manage the information that is made available to the application to recognize input to the application. The system process may do so in ways that facilitate input recognition that is efficient, accurate, consistent (within the application and across multiple applications), and that allow the application to potentially use easier-to-implement input recognition and/or legacy input recognition processes, such as input recognition processes developed for different systems or input environment, e.g., using touch screen input processes used in legacy mobile apps.

Some implementations, use a system process to provide interaction event data to applications to enable the applications to recognize input. The interaction event data may be limited so that all user activity data is not available to the applications. Providing only limited user activity information may help protect user privacy. The interaction event data may be configured to correspond to events that can be recognized by the application using a general or legacy recognition process. For example, a system process may interpret 3D user activity data to provide interaction event data to an application that the application can recognize in the same way that the application would recognize a touch event on a touch screen. In some implementations, an application receives interaction event data corresponding to only certain types of user activity, e.g., intentional, or deliberate actions on user interface objects, and may not receive information about other types of user activity, e.g., gaze only activities, a user moving their hands in ways not associated with user interface interactions, a user moving closer to or further away from the user interface, etc. In one example, during a period of time (e.g., a minute, 10 minutes, etc.) a user gazes around a 3D XR environment including gazes at certain user interface text, buttons, and other user interface elements and eventually performs an intentional user interface interaction, e.g., by making an intentional pinch gesture while gazing at button X. A system process may handle all of the user interface feedback during the gazing around at the various user interface elements without providing the application information about these gazes. On the other hand, the system process may provide interaction event data to the application based on the intentional pinch gesture while gazing at button X. However, even this interaction event data may provide limited information to the application, e.g., providing an interaction position or pose identifying an interaction point on button X without providing information about the actual gaze direction. The application can then interpret this interaction point as an interaction with the button X and respond accordingly. Thus, user behavior that is not associated with intentional user interactions with user interface elements (e.g., gaze only hover, menu expansion, reading, etc.) are handled out of process without the application having access to user data and the information about the intentional user interface element interactions is limited such that it does not include all of the user activity details.

FIG. 12 is a flowchart illustrating a method 1200 for providing a graphical indication corresponding to a determined shape of a user interface element based on identifying a user interaction event corresponding to the user activity, in accordance with some implementations. In some implementations, a device such as electronic device 105 or electronic device 110 performs method 1200. In some implementations, method 1200 is performed on a mobile device, desktop, laptop, HMD, or server device. The method 1200 is performed by processing logic, including hardware, firmware, software, or a combination thereof. In some implementations, the method 1200 is performed on a processor executing code stored in a non-transitory computer-readable medium (e.g., a memory).

Various implementations of the method 1200 disclosed herein graphically indicate a determined shape of a user interface element (e.g., on a 2D webpage) viewed in an XR environment using a 3D display device (e.g., a wearable device such as an HMD (device 105)) based on a user's intent (attention) directed at the user interface element. The goal is to match arbitrary shapes of a user interface element with a visual effect that provides a glow or a highlight. Various implementations of the method 1200 disclosed herein may match a graphical indication to a determined shape of the user interface element rather than using a predefined shape (e.g., a standard rectangle shape that surrounds a circular element). In other words, if the user interface element is a star shape, the glow or highlight around the user interface element will also display a star shape.

At block 1202, the method 1200 presents a view of a 3D environment, where one or more user interface elements are positioned at 3D positions based on a 3D coordinate system associated with the 3D environment. For example, as illustrated in FIG. 2A-2B, a 2D webpage (e.g., user interface 230) may be viewed using a 3D device (e.g., device 105). In some implementations, at an input support process, the process includes obtaining data corresponding to positioning of user interface elements of the application within a 3D coordinate system. The data may correspond to the positioning of the user interface element based at least in part on data (e.g., positions/shapes of 2D elements intended for a 2D window area) provided by the application, for example, such as user interface information provided from an application to operating system process. In some implementations, the operating system manages information about a virtual and/or real content positioned within a 3D coordinate system. Such a 3D coordinate system may correspond to an XR environment representing the physical environment and/or virtual content corresponding to content from one or more apps. The executing application may provide information about the positioning of its user interface elements via a layered tree (e.g., a declarative, hierarchical layer tree) with some layers identified for remote (i.e., out of app process) input effects.

At block 1204, the method 1200 determines a shape of the one or more user interface elements. For example, the process identifies a 2D or a 3D shape or geometric representation of the user interface element (e.g., a star shape, a circular shape, a shape of a building, etc.). In some implementations, determining a shape may be based on identifying/detecting the user interface element as an interactive item (e.g., an interactive icon associated with an application a user can click on).

In some implementations, determining the shape is based on formatting information associated with the one or more user interface elements. For example, the formatting information may be based on information associated with the webpage or user interface such as SVG information for vector graphics and/or other image data. For example, there may be some information from the basic shapes, paths, or may contain masks or clip paths of a user interface element. Additionally, or alternatively, other image data associated with a user interface element may include RGB data or image metadata for bitmap images. In some implementations, determining a shape may be based on image maps or other image recognition techniques for recognizing photo items. For example, detecting user interface elements based on image maps to provide an easier way of linking various parts of an image without dividing the image into separate image files.

At block 1206, the method 1200 receives data corresponding to user activity in the 3D coordinate system. For example, user activity data may include hands data and gaze data, or data corresponding to other input modalities (e.g., an input controller). As described with respect to FIG. 11, such data may include but is not limited to including hands data, gaze data, and/or human interface device (HID) data. A single type of data or various combinations of two or more different types of data may be received, e.g., hands data and gaze data, controller data and gaze data, hands data and controller data, voice data and gaze data, voice data and hands data, etc. Different combinations of sensor/HID data may correspond to different input modalities. In one exemplary implementation, the data includes both hands data (e.g., a hand pose skeleton identifying 20+ joint locations) and gaze data (e.g., a stream of gaze vectors), and both the hands data and gaze data may both be relevant to recognizing input via a direct touch input modality and an indirect touch input modality.

At block 1208, the method 1200 identifies a user interaction event associated with a first user interface element in the 3D environment based on the data corresponding to the user activity. For example, a user interaction event may be based on determining whether a user is focused (attentive) towards a particular object (e.g., a user interface element) using gaze and/or pinch data based on the direction of eye gaze, head, hand, arm, etc. In some implementations, identifying the user interaction event may be based on determining that a pupillary response corresponds to directing attention to a region associated with the user interface element. In some implementations, identifying the user interaction event may be based on a finger point and hand movement gesture. In some implementations, the user interaction event is based on a direction of a gaze or a face of a user with respect to the user interface. The direction of a face of a user with respect to the user interface may be determined by extending a ray from a position on the face of the user and determining that the ray intersects the visual element on the user interface.

At block 1210, in accordance with identifying the user interaction event, the method 1200 provides a graphical indication (e.g., a visual effect-glow, highlight, etc.) corresponding to the determined shape of the first user interface element. For example, after identifying that a particular user interface element is associated with an interaction event (user attention), the graphical indication matches a border/shape of an item rather than using a predefined shape (e.g., rectangle that surrounds a circular affordance). For example, as illustrated in FIGS. 5B, 6B, and 7B, a graphical indication 520, 620, 720, respectively, matches the identified shape of the associated user interface element (e.g., a star-shaped graphical indication 520 matched the star-shaped user interface element 246). In some implementations, the graphical indication may be configured based on a determined type of item, such as photo items using attributes such as size, entropy, and/or resolution to configure the effect (e.g., based on confidence thresholds). In some implementations, there may be size constraints for the graphical indication, e.g., if the user interface element is too big. In some implementations, the color of the user interface element may match the visual appearance of the graphical indication. In some implementations, the shape of the glow effect may be different based on the determined shape of the object (e.g., a round shaped glow with gradient centered where user is looking, but if a star shape, then there may be a star shape glow that matches).

In some implementations, determining a shape may be based on consolidating elements of a single interactive item (e.g., different layers/elements corresponding to what the user perceives as a single element). In an exemplary implementation, determining the shape of the first user interface element includes identifying sub-elements of the first user interface element, and determining the shape of the first user interface element based on the identified sub-elements. In some implementations, the graphical indication corresponds to the identified sub-elements of the first user interface element. For example, graphical indication 920 which goes further below the house by the person on the bottom left side of the user interface element 818 of FIG. 9B.

In some implementations, the graphical indication visual effect may remove transparent areas. In an exemplary implementation, providing the graphical indication includes removing a portion of a view of the first user interface element within the view of the 3D environment (e.g., removes transparent areas of the user interface element).

In some implementations, there are temporal aspects for determining when to display a graphical indication. In an exemplary implementation, the graphical indication is displayed for a first instance based on one or more first attributes, and the graphical indication is displayed for a second instance different than the first instance based on one or more second attributes different than the first attributes. For example, the graphical indication may not glow until after a few ms of user attention, and/or the visual effect (glow) may get brighter and brighter based on a user looking at the element for a certain period of time (e.g., greater than one or two seconds). For example, as illustrated in FIG. 7C, the graphical indication 722 is larger than the graphical indication 720 of FIG. 7B as the user has continue to direct attention at the user interface element 247 for a period of time.

In some implementations, the interaction event data may include an interaction pose (e.g., 6DOF data for a point on the app's user interface), a manipulator pose (e.g., 3D location of the stable hand center or pinch centroid), an interaction state (e.g., direct, indirect, hover, pinch, etc.) and/or identify which user interface element is being interacted with. In some implementations, the interaction data may exclude data associated with user activity occurring between intentional events. The interaction event data may exclude detailed sensor/HID data such as hand skeleton data. The interaction event data may abstract detailed sensor/HID data to avoid providing data to the application that is unnecessary for the application to recognize inputs and potentially private to the user.

In some implementations, the method 900 may display a view of an extended reality (XR) environment corresponding to the (3D) coordinate system, where the user interface elements of the application are displayed in the view of the XR environment. Such an XR environment may include user interface elements from multiple application processes corresponding to multiple applications and the input support process may identify the interaction event data for the multiple applications and route interaction event data to only the appropriate applications, e.g., the applications to which the interactions are intended by the user. Accurately routing data to only the intended applications may help ensure that one application does to misuse input data intended for another application (e.g., one application does not track a user entering a password into another application).

In some implementations, the data corresponding to the user activity may have various formats and be based on or include (without being limited to being based on or including) sensor data (e.g., hands data, gaze data, head pose data, etc.) or HID data. In some implementations, the data corresponding to the user activity includes gaze data including a stream of gaze vectors corresponding to gaze directions over time during use of the electronic device. The data corresponding to the user activity may include hands data including a hand pose skeleton of multiple joints for each of multiple instants in time during use of the electronic device. The data corresponding to the user activity may include both hands data and gaze data. The data corresponding to the user activity may include controller data and gaze data. The data corresponding to the user activity may include, but is not limited to, any combination of data of one or more types, associated with one or more sensors or one or more sensor types, associated with one or more input modalities, associated with one or more parts of a user (e.g., eyes, nose, cheeks, mouth, hands, fingers, arms, torso, etc.) or the entire user, and/or associated with one or more items worn or held by the user (e.g., mobile devices, tablets, laptops, laser pointers, hand-held controllers, wands, rings, watches, bracelets, necklaces, etc.).

In some implementations, the method 900 further includes identifying the interaction event data for the application and may involve identifying only certain types of activity within the user activity to be included in the interaction event data. In some implementations, activity (e.g., types of activity) of the user activity that is determined to correspond to unintentional events rather than intentional user interface element input is excluded from the interaction event data. In some implementations, passive gaze-only activity of the user activity is excluded from the interaction event data. Such passive gaze-only behavior (not intentional input) is distinguished from intentional gaze-only interactions (e.g., gaze dwell, or performing a gaze up to the sky gesture to invoke/dismiss the gaze HUD, etc.).

Identifying the interaction event data for the application may involve identifying only certain attributes of the data corresponding to the user activity for inclusion in the interaction event data, e.g., including a hand center rather than the positions of all joints used to model a hand, including a single gaze direction or a single HID pointing direction for a given interaction event. In another example, a start location of a gaze direction/HID pointing direction is changed or withheld, e.g., to obscure data indicative of how far the user is from the user interface or where the user is in the 3D environment. In some implementations, the data corresponding to the user activity includes hands data representing the positions of multiple joints of a hand and the interaction event data includes a single hand pose that is provided instead of the hands data.

In some implementations, the method 900 is performed by an electronic device that is a head-mounted device (HMD) and/or the XR environment is a virtual reality environment or an augmented reality environment.

Figure 13:
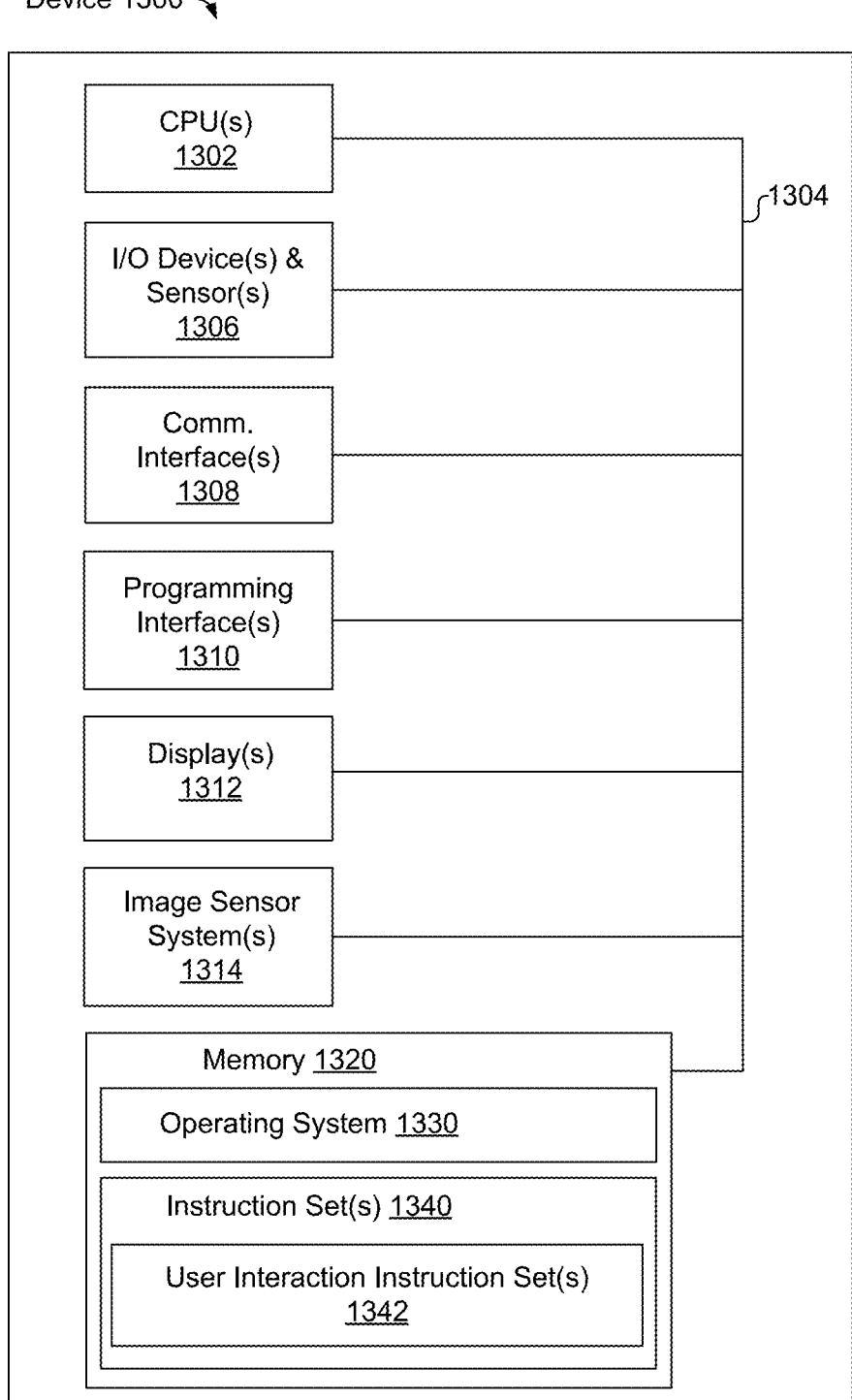
FIG. 13 is a block diagram of an electronic device of in accordance with some implementations.

FIG. 13 is a block diagram of electronic device 1300. Device 1300 illustrates an exemplary device configuration for electronic device 110 or electronic device 105. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1300 includes one or more processing units 1302 (e.g., microprocessors, ASICs, FPGAs, GPUS, CPUs, processing cores, and/or the like), one or more input/output (I/O) devices and sensors 1306, one or more communication interfaces 1308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 1310, one or more output device(s) 1312, one or more interior and/or exterior facing image sensor systems 1314, a memory 1320, and one or more communication buses 1304 for interconnecting these and various other components.

In some implementations, the one or more communication buses 1304 include circuitry that interconnects and controls communications between system components. In some implementations, the one or more I/O devices and sensors 1306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 1312 include one or more displays configured to present a view of a 3D environment to the user. In some implementations, the one or more output device(s) 1312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 1300 includes a single display. In another example, the device 1300 includes a display for each eye of the user.

In some implementations, the one or more output device(s) 1312 include one or more audio producing devices. In some implementations, the one or more output device(s) 1312 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 1312 may additionally or alternatively be configured to generate haptics.

In some implementations, the one or more image sensor systems 1314 are configured to obtain image data that corresponds to at least a portion of a physical environment. For example, the one or more image sensor systems 1314 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1314 further include illumination sources that emit light, such as a flash. In various implementations, the one or more image sensor systems 1314 further include an on-camera image signal processor (ISP) configured to execute a plurality of processing operations on the image data.

The memory 1320 includes high-speed random-access memory, such as DRAM, SRAM, DDR RAM, or other random-access solid-state memory devices. In some implementations, the memory 1320 includes non-volatile memory, such as one or more magnetic disk storage devices, optical disk storage devices, flash memory devices, or other non-volatile solid-state storage devices. The memory 1320 optionally includes one or more storage devices remotely located from the one or more processing units 1302. The memory 1320 includes a non-transitory computer readable storage medium.

In some implementations, the memory 1320 or the non-transitory computer readable storage medium of the memory 1320 stores an optional operating system 1330 and one or more instruction set(s) 1340. The operating system 1330 includes procedures for handling various basic system services and for performing hardware dependent tasks. In some implementations, the instruction set(s) 1340 include executable software defined by binary information stored in the form of electrical charge. In some implementations, the instruction set(s) 1340 are software that is executable by the one or more processing units 1302 to carry out one or more of the techniques described herein.

The instruction set(s) 1340 include user interaction instruction set(s) 1342 configured to, upon execution, identify and/or interpret user gestures and other user activities as described herein. The instruction set(s) 1340 include application instruction set(s) 1344 for one or more applications. In some implementations, each of the applications is provided for as a separately-executing set of code, e.g., capable of being executed via an application process. The instruction set(s) 1340 may be embodied as a single software executable or multiple software executables.

Although the instruction set(s) 1340 are shown as residing on a single device, it should be understood that in other implementations, any combination of the elements may be located in separate computing devices. Moreover, the figure is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 14:
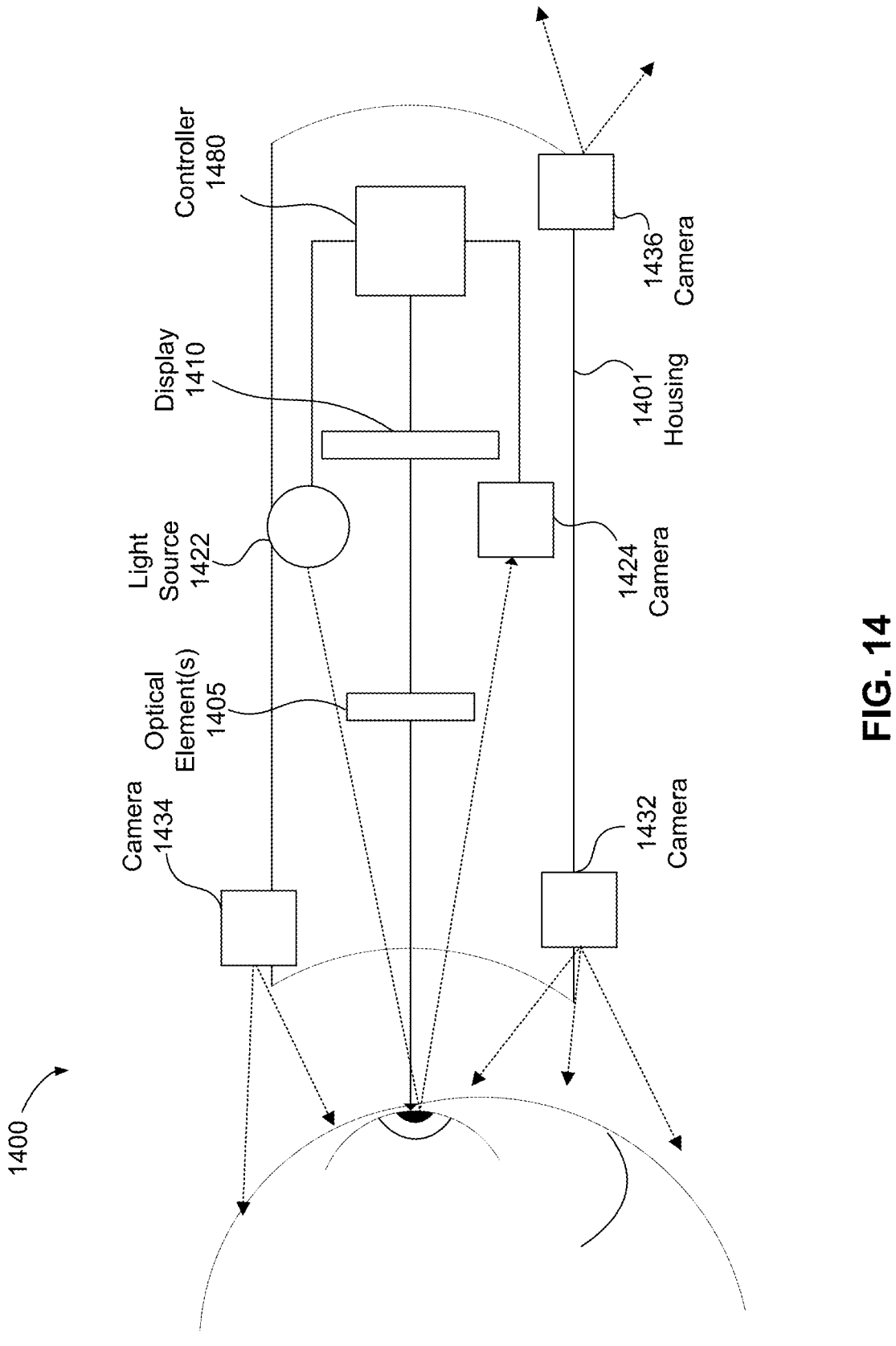
FIG. 14 is a block diagram of an exemplary head-mounted device, in accordance with some implementations.

FIG. 14 illustrates a block diagram of an exemplary head-mounted device 1400 in accordance with some implementations. The head-mounted device 1400 includes a housing 1401 (or enclosure) that houses various components of the head-mounted device 1400. The housing 1401 includes (or is coupled to) an eye pad (not shown) disposed at a proximal (to the user 102) end of the housing 1401. In various implementations, the eye pad is a plastic or rubber piece that comfortably and snugly keeps the head-mounted device 1400 in the proper position on the face of the user 102 (e.g., surrounding the eye of the user 102).

The housing 1401 houses a display 1410 that displays an image, emitting light towards or onto the eye of a user 102. In various implementations, the display 1410 emits the light through an eyepiece having one or more optical elements 1405 that refracts the light emitted by the display 1410, making the display appear to the user 102 to be at a virtual distance farther than the actual distance from the eye to the display 1410. For example, optical element(s) 1405 may include one or more lenses, a waveguide, other diffraction optical elements (DOE), and the like. For the user 102 to be able to focus on the display 1410, in various implementations, the virtual distance is at least greater than a minimum focal distance of the eye (e.g., 7 cm). Further, in order to provide a better user experience, in various implementations, the virtual distance is greater than 1 meter.

The housing 1401 also houses a tracking system including one or more light sources 1422, camera 1424, camera 1432, camera 1434, camera 1436, and a controller 1480. The one or more light sources 1422 emit light onto the eye of the user 102 that reflects as a light pattern (e.g., a circle of glints) that may be detected by the camera 1424. Based on the light pattern, the controller 1480 may determine an eye tracking characteristic of the user 102. For example, the controller 1480 may determine a gaze direction and/or a blinking state (eyes open or eyes closed) of the user 102. As another example, the controller 1480 may determine a pupil center, a pupil size, or a point of regard. Thus, in various implementations, the light is emitted by the one or more light sources 1422, reflects off the eye of the user 102, and is detected by the camera 1424. In various implementations, the light from the eye of the user 102 is reflected off a hot mirror or passed through an eyepiece before reaching the camera 1424.

The display 1410 emits light in a first wavelength range and the one or more light sources 1422 emit light in a second wavelength range. Similarly, the camera 1424 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 102 selects an option on the display 1410 by looking at it), provide foveated rendering (e.g., present a higher resolution in an area of the display 1410 the user 102 is looking at and a lower resolution elsewhere on the display 1410), or correct distortions (e.g., for images to be provided on the display 1410).

In various implementations, the one or more light sources 1422 emit light towards the eye of the user 102 which reflects in the form of a plurality of glints.

In various implementations, the camera 1424 is a frame/shutter-based camera that, at a particular point in time or multiple points in time at a frame rate, generates an image of the eye of the user 102. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 1424 is an event camera including a plurality of light sensors (e.g., a matrix of light sensors) at a plurality of respective locations that, in response to a particular light sensor detecting a change in intensity of light, generates an event message indicating a particular location of the particular light sensor.

In various implementations, the camera 1432, camera 1434, and camera 1436 are frame/shutter-based cameras that, at a particular point in time or multiple points in time at a frame rate, may generate an image of the face of the user 102 or capture an external physical environment. For example, camera 1432 captures images of the user's face below the eyes, camera 1434 captures images of the user's face above the eyes, and camera 1436 captures the external environment of the user (e.g., environment 100 of FIG. 1). The images captured by camera 1432, camera 1434, and camera 1436 may include light intensity images (e.g., RGB) and/or depth image data (e.g., Time-of-Flight, infrared, etc.).

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:

at an electronic device having a processor:

presenting a view of a three-dimensional (3D) environment, wherein one or more user interface elements are positioned at 3D positions based on a 3D coordinate system associated with the 3D environment;

determining a shape of the one or more user interface elements;

receiving data corresponding to user activity in the 3D coordinate system;

identifying a user interaction event associated with a first user interface element in the 3D environment based on the data corresponding to the user activity; and in accordance with identifying the user interaction event, providing a graphical indication corresponding to the determined shape of the first user interface element, wherein determining the shape is based on an image map associated with the one or more user interface elements.

2. The method of claim 1, wherein determining the shape is based on identifying that a user interface element comprises an interactive item.

3. The method of claim 1, wherein determining the shape is based on formatting information associated with the one or more user interface elements.

4. The method of claim 1, wherein providing the graphical indication corresponding to the determined shape of the first user interface element comprises matching a shape of the graphical indication to the shape of the first user interface element.

5. The method of claim 1, wherein determining the shape of the first user interface element comprises:

identifying sub-elements of the first user interface element; and determining the shape of the first user interface element based on the identified sub-elements, wherein the graphical indication corresponds to the identified sub-elements of the first user interface element.

6. The method of claim 1, wherein providing the graphical indication comprises removing a portion of a view of the first user interface element within the view of the 3D environment.

7. The method of claim 1, wherein the graphical indication is a highlighting effect or glow effect corresponding to the user interface element.

8. The method of claim 1, wherein the graphical indication is based on determining a type of the user interface element.

9. The method of claim 1, wherein the graphical indication is displayed for a first instance based on one or more first attributes, and wherein the graphical indication is displayed for a second instance different than the first instance based on one or more second attributes different than the first attributes.

10. The method of claim 1, wherein the data corresponding to the user activity is obtained via one or more sensors on the device.

11. The method of claim 1, wherein the data corresponding to the user activity comprises gaze data comprising a stream of gaze vectors corresponding to gaze directions over time during use of the electronic device.

12. The method of claim 1, wherein the data corresponding to the user activity comprises hands data comprising a hand pose skeleton of multiple joints for each of multiple instants in time during use of the electronic device.

13. The method of claim 1, wherein the data corresponding to the user activity comprises hands data and gaze data.

14. The method of claim 1, wherein the data corresponding to the user activity comprises controller data and gaze data.

15. The method of claim 1, wherein the data corresponding to the user activity comprises head pose data of the user.

16. The method of claim 1, wherein the electronic device comprises a head-mounted device (HMD).

17. A device comprising:

a non-transitory computer-readable storage medium; and one or more processors coupled to the non-transitory computer-readable storage medium, wherein the non-transitory computer-readable storage medium comprises program instructions that, when executed on the one or more processors, cause the one or more processors to perform operations comprising:

presenting a view of a three-dimensional (3D) environment, wherein one or more user interface elements are positioned at 3D positions based on a 3D coordinate system associated with the 3D environment;

determining a shape of the one or more user interface elements;

receiving data corresponding to user activity in the 3D coordinate system;

identifying a user interaction event associated with a first user interface element in the 3D environment based on the data corresponding to the user activity; and in accordance with identifying the user interaction event, providing a graphical indication corresponding to the determined shape of the first user interface element, wherein determining the shape is based on an image map associated with the one or more user interface elements.

18. A non-transitory computer-readable storage medium, storing program instructions executable on a device to perform operations comprising:

presenting a view of a three-dimensional (3D) environment, wherein one or more user interface elements are positioned at 3D positions based on a 3D coordinate system associated with the 3D environment;

determining a shape of the one or more user interface elements;

receiving data corresponding to user activity in the 3D coordinate system;

identifying a user interaction event associated with a first user interface element in the 3D environment based on the data corresponding to the user activity; and in accordance with identifying the user interaction event, providing a graphical indication corresponding to the determined shape of the first user interface element, wherein determining the shape is based on an image map associated with the one or more user interface elements.

* * * * *